(12) United States Patent
Shino

(10) Patent No.: US 6,466,219 B1
(45) Date of Patent: Oct. 15, 2002

(54) STORAGE DEVICE AND IMAGE DATA PROCESSING APPARATUS

(75) Inventor: Toshiaki Shino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/435,985

(22) Filed: Nov. 8, 1999

(30) Foreign Application Priority Data

Nov. 9, 1998 (JP) .............................. 10-318133

(51) Int. Cl.[7] .................................. G09G 5/39
(52) U.S. Cl. .................. 345/531; 345/552; 345/537; 345/558
(58) Field of Search ................... 345/536–538, 345/531, 582, 552, 558, 530, 419, 587; 711/100, 111, 112; 709/250, 200

(56) References Cited

U.S. PATENT DOCUMENTS

| | | | | |
|---|---|---|---|---|
| 5,831,624 A | * | 11/1998 | Tarolli et al. ................ | 345/587 |
| 5,875,453 A | * | 2/1999 | Kojima ........................ | 711/112 |
| 5,877,770 A | * | 3/1999 | Hanaoka ...................... | 345/552 |
| 6,338,095 B1 | * | 1/2002 | Yasuda et al. ............... | 709/250 |

* cited by examiner

*Primary Examiner*—Kee M. Tung
(74) *Attorney, Agent, or Firm*—Fulwider Patton Lee & Utecht, LLP

(57) ABSTRACT

A storage device and an image data processing apparatus capable of simplifying input control of an FIFO circuit, comprising a DRAM capable of storing image data in a plurality of read indication signals giving different data lengths of valid pixel data to be read by one read operation, an FIFO circuit for receiving as input the valid pixel data read from the DRAM and storing the same, and an address generation unit for generating a read request for a number of times in accordance with the read indication signal when a predetermined amount of an empty region is generated in the memory region of the FIFO circuit in order that all of the valid pixel data output from the DRAM to the FIFO circuit by the read request be written in the empty region.

14 Claims, 26 Drawing Sheets

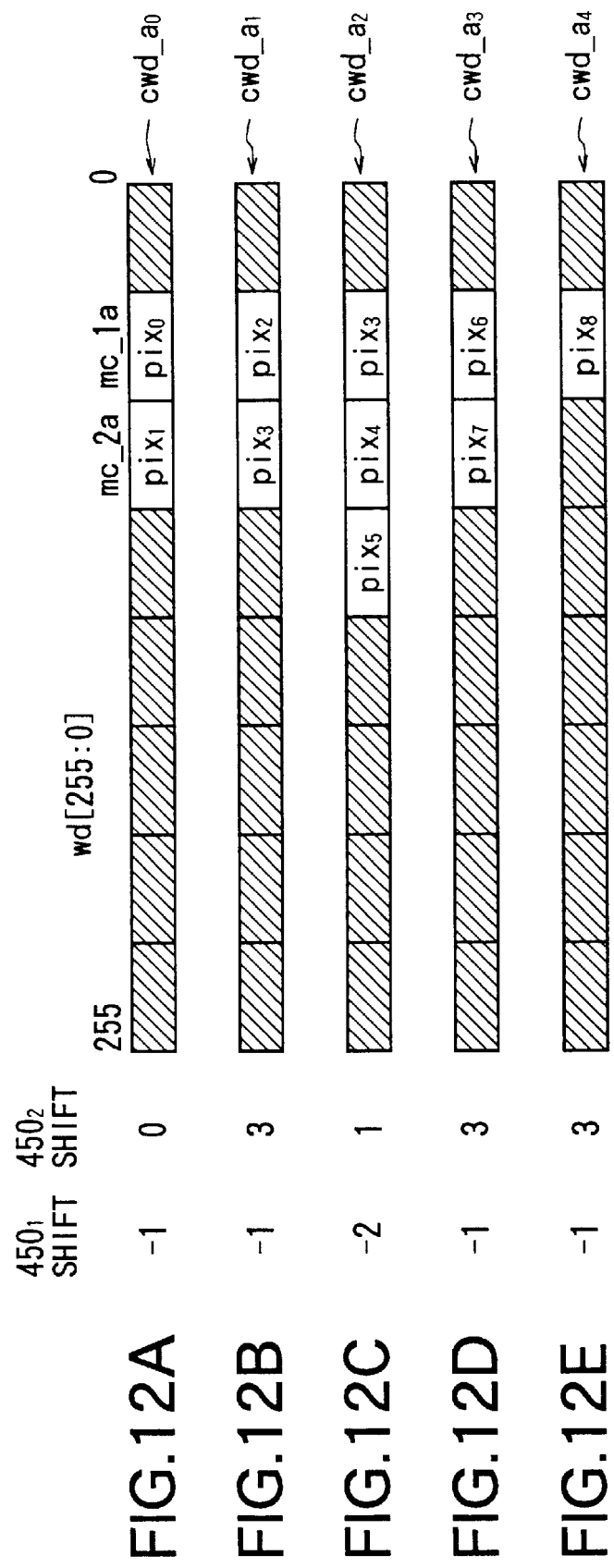

| | (btrx[10:0], btry[10:1]) | cwd[255:0] | | btrvld[15:0] |
|---|---|---|---|---|
| FIG.13A | (4, 4) | 255 ... pix₁ pix₀ ← cwd₀ | 0 | 0×0600 ← btrvld₀ |
| FIG.13B | (6, 4) | ... pix₂ ← cwd₁ | | 0×0200 ← btrvld₁ |
| FIG.13C | (4, 6) | ... pix₅ ... pix₄ pix₃ ← cwd₂ | | 0×000e ← btrvld₂ |
| FIG.13D | (4, 6) | ... pix₇ pix₆ ← cwd₃ | | 0×0600 ← btrvld₃ |
| FIG.13E | (6, 6) | ... pix₈ ← cwd₄ | | 0×0200 ← btrvld₄ |

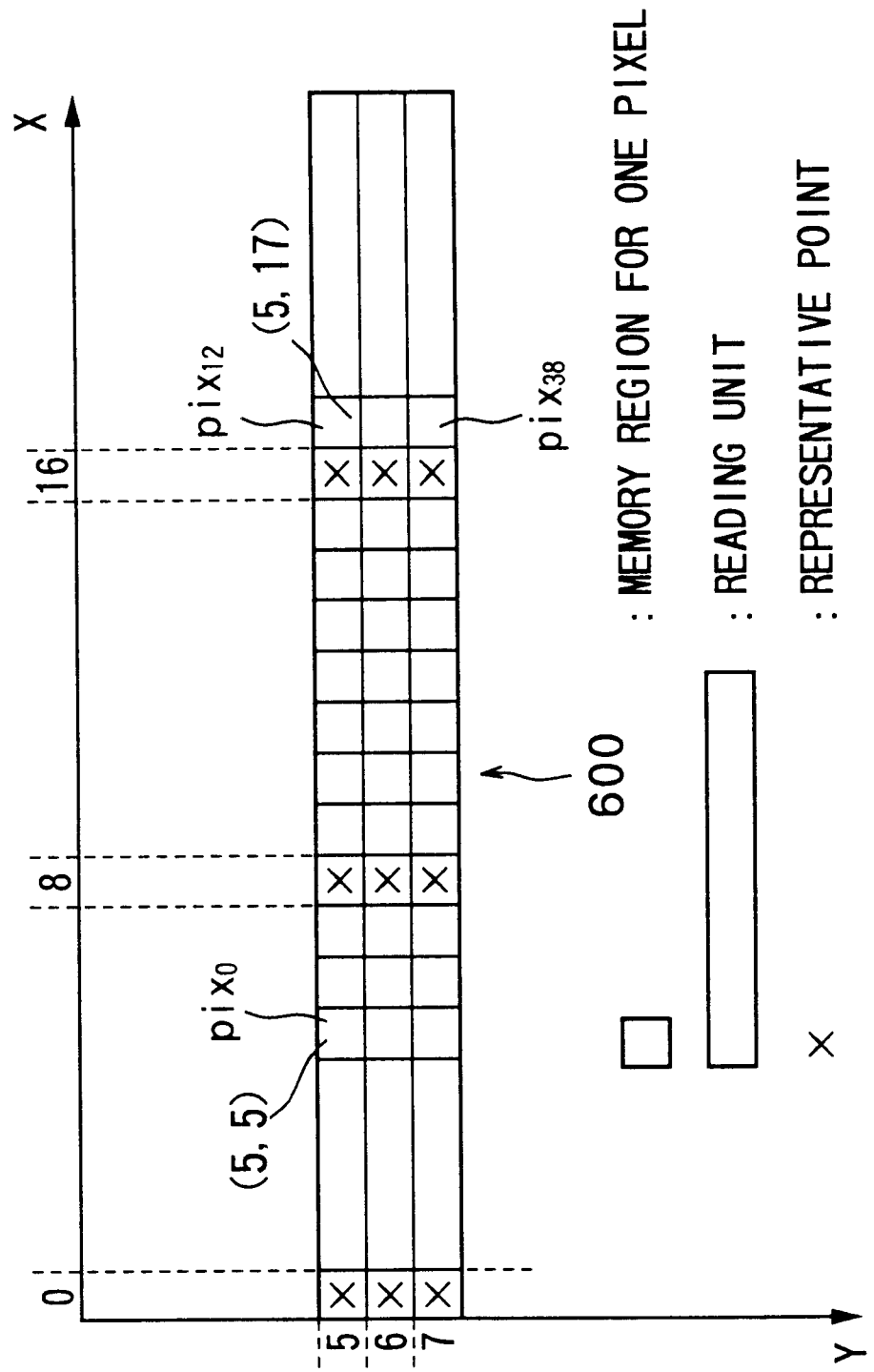

FIG.20A (sbx[10:3], sby[10:0]) mc_7dtr[31:0] mc_6dtr[31:0] mc_5dtr[31:0] mc_4dtr[31:0] mc_3dtr[31:0] mc_2dtr[31:0] mc_1dtr[31:0] mc_0dtr[31:0]

FIG.20B $(sbx_0, sby_0) = (0, 5)$ | $pix_2$ | $pix_1$ | $pix_0$ | | $pix_3$ | | $pix_4$ | | $pix_5$ | | $pix_6$ | | $pix_7$ |

FIG.20C $(sbx_1, sby_1) = (8, 5)$ | $pix_{10}$ | $pix_9$ | $pix_8$ | | $pix_{11}$ | | $pix_{12}$ |

FIG.20D $(sbx_2, sby_2) = (16, 5)$ | $pix_{15}$ | $pix_{14}$ | $pix_{13}$ |

FIG.20E $(sbx_3, sby_3) = (0, 6)$ | $pix_{23}$ | $pix_{22}$ | $pix_{21}$ | $pix_{20}$ | $pix_{19}$ | $pix_{18}$ | $pix_{17}$ | $pix_{16}$ |

FIG.20F $(sbx_4, sby_4) = (8, 6)$ | $pix_{28}$ | $pix_{27}$ | $pix_{26}$ | $pix_{25}$ | $pix_{24}$ |

FIG.20G $(sbx_5, sby_5) = (16, 6)$

FIG.20H $(sbx_6, sby_6) = (0, 7)$ | $pix_{36}$ | $pix_{35}$ | $pix_{34}$ | $pix_{33}$ | $pix_{32}$ | $pix_{31}$ | $pix_{30}$ | $pix_{29}$ |

FIG.20I $(sbx_7, sby_7) = (8, 7)$ | | | | | $pix_{38}$ | $pix_{37}$ |

FIG.20I $(sbx_8, sby_8) = (16, 7)$

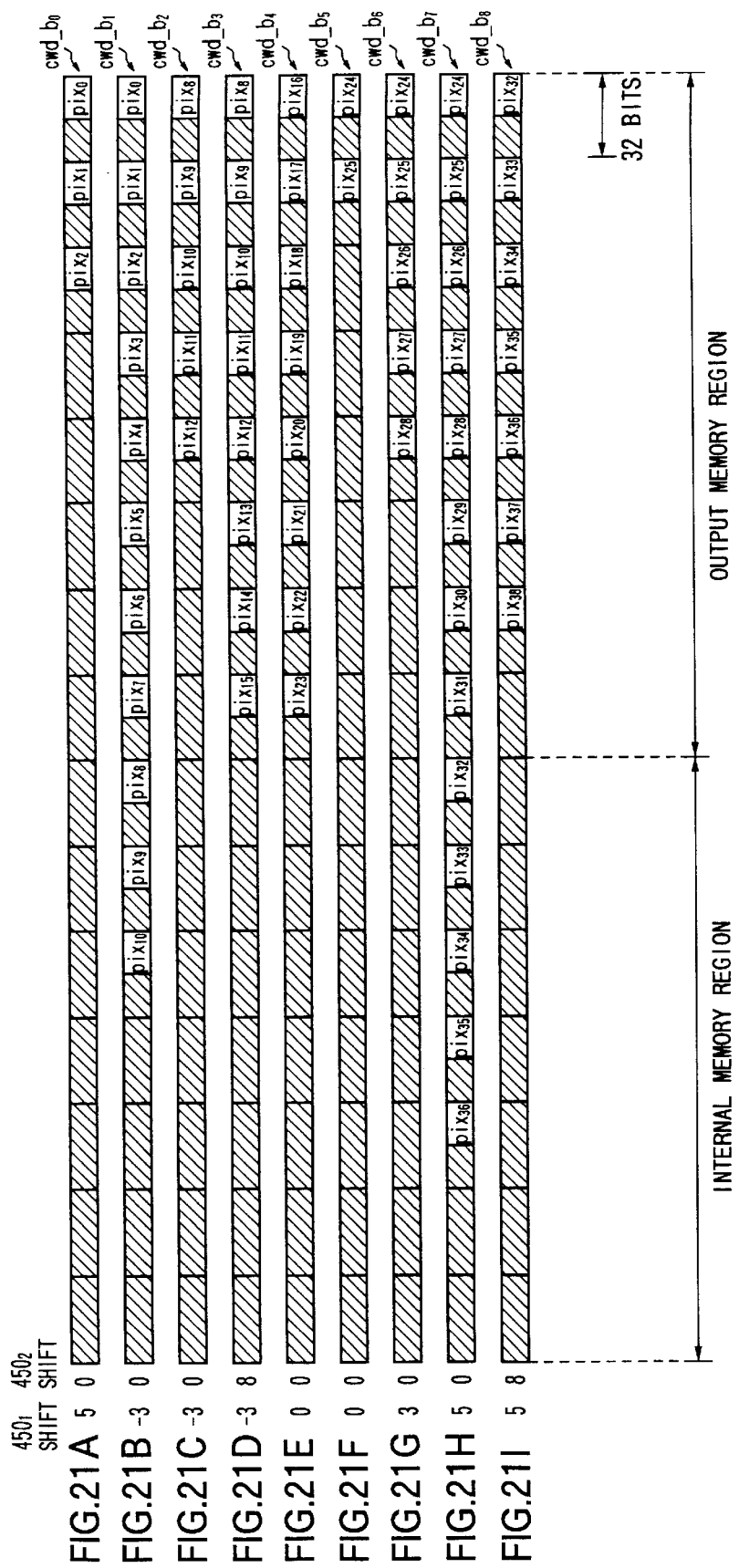

FIG.26

| PIXEL DATA LENGTH(BIT) | READ INSTRUCTION TIMES |
|---|---|
| 32 | 2 |
| 16 | 4 |
| 8 | 8 |
| 4 | 16 |

WHEN HALF(8 STAGES) OF MEMORY REGION BECOMES EMPTY IN FIFO CIRCUIT

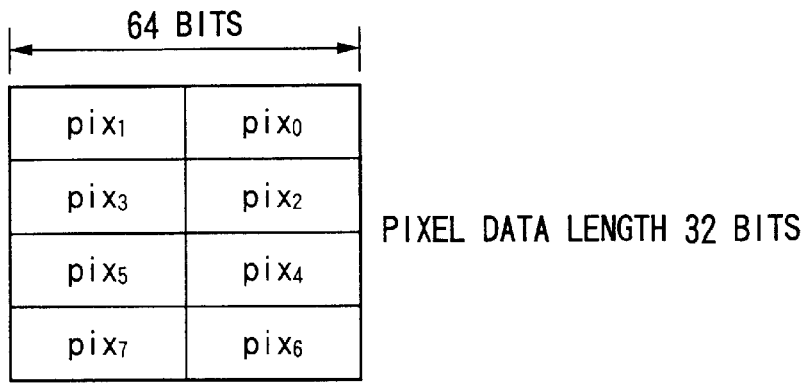
FIG.27A — PIXEL DATA LENGTH 32 BITS
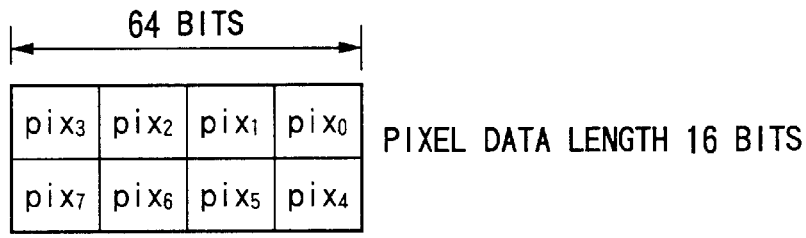
FIG.27B — PIXEL DATA LENGTH 16 BITS
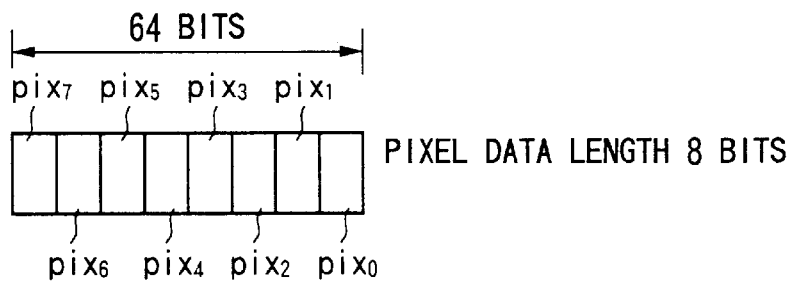
FIG.27C — PIXEL DATA LENGTH 8 BITS
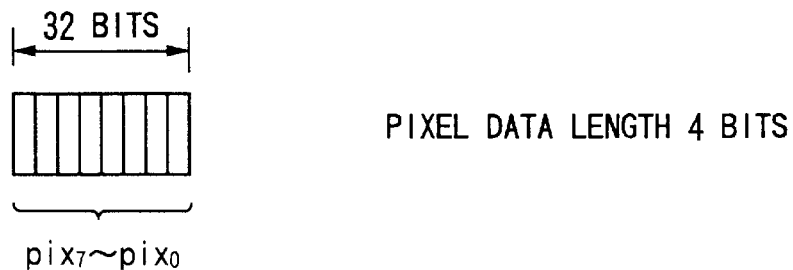
FIG.27D — PIXEL DATA LENGTH 4 BITS

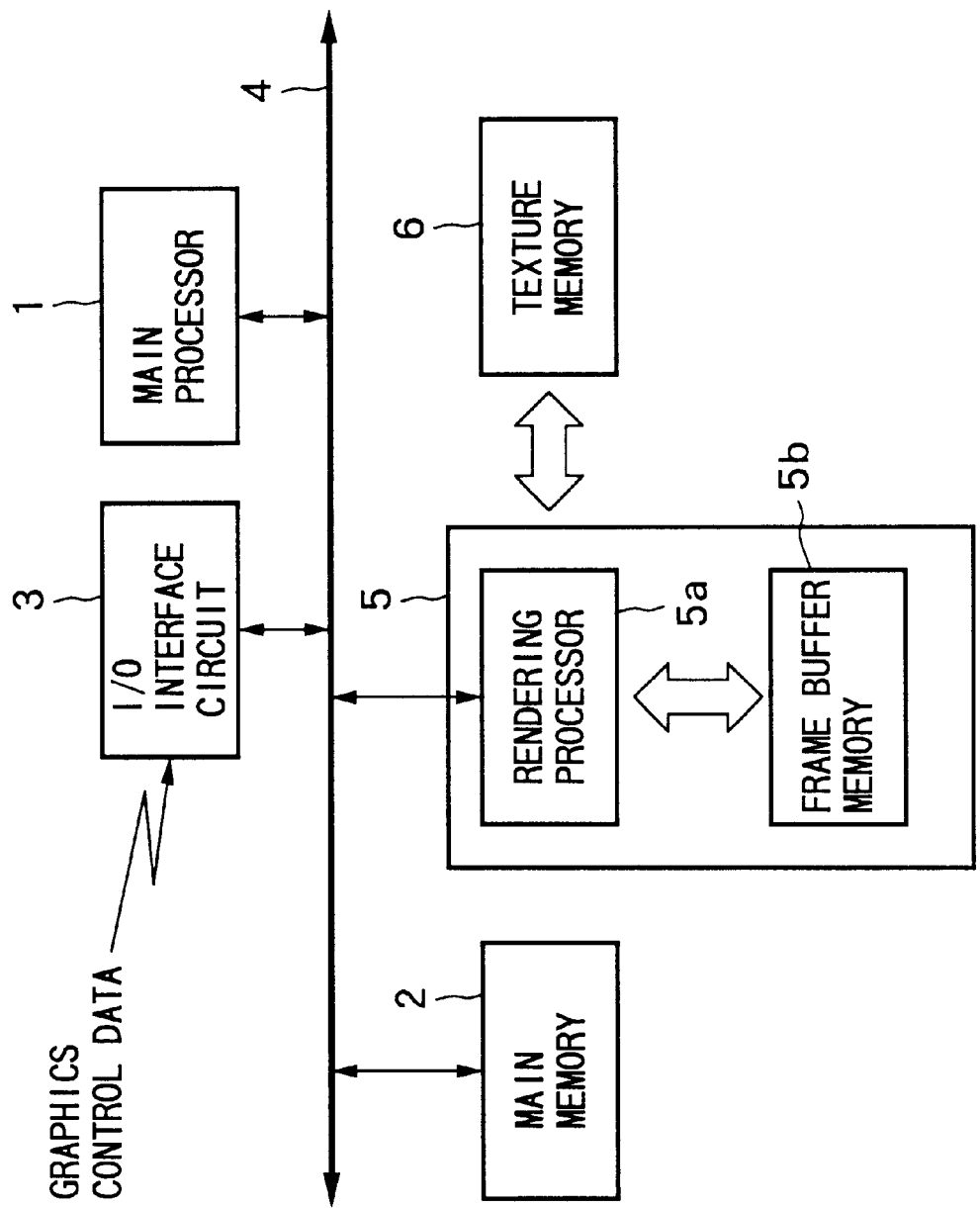

STORAGE DEVICE AND IMAGE DATA PROCESSING APPARATUS

BACKGROUND OF THE INVENTION

1. Field of the Invention

The present invention relates to a storage device and an image data processing apparatus.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as an composite of triangular unit graphics (polygons). By drawing the polygons as units, the colors of the pixels of the display screen are decided.

In polygon rendering, coordinates (x, y, z), color data (R, G, B), homogeneous coordinates (s, t) of texture data indicating a composite image pattern, and a value of the homogeneous term q for the respective vertexes of the triangle in a physical coordinate system are input and processing is performed for interpolation of these values inside the triangle.

Here, the homogeneous term q is, simply stated, like an expansion or reduction rate. Coordinates in a UV coordinate system of an actual texture buffer, namely, texture coordinate data (u, v), are comprised of the homogeneous coordinates (s, t) divided by the homogeneous term q to give "s/q" and "t/q" which in turn are multiplied by texture sizes USIZE and VSIZE, respectively.

FIG. 28 is a view of the system configuration of the basic concept of a three-dimensional computer graphics system.

In the three-dimensional computer graphics system, data for drawing graphics etc. is given from a main memory 2 of a main processor 1 or an I/O interface circuit 3 for receiving graphic data from outside to a rendering circuit 5 having a rendering processor 5a and a frame buffer memory 5b via a main bus 4.

The rendering processor 5a is connected to a frame buffer 5b for holding data to be displayed and a texture memory 6 for holding texture data to be applied on a surface of a graphic element (for example, a triangle) to be drawn.

Then, the rendering processor 5a performs processing to draw to the frame buffer 5b the graphic element being given a texture on its surface for every element.

The frame buffer 5b and the texture memory 6 are generally composed of a dynamic random access memory (DRAM).

Between the frame buffer 5b and texture memory 6 and the main processor is usually provided a first-in first-out (FIFO) circuit.

In the related art, when outputting data read for example from the frame buffer 5b and the texture memory 6 to the main processor 1 via the FIFO circuit, a controller monitors an empty region of the FIFO circuit. When the amount of the empty region becomes a predetermined value or more, a read request is continuously output to the frame buffer memory 5b and the texture memory 6 until the empty region is used up.

When image data including a plurality of pixel data is read from the frame buffer 5b or the texture memory 6 into the main processor 1 by a read request, if only continuously outputting the read request until the empty region is used up as explained above, there arises a situation that a part of the image data included in the read image data in accordance with the last read request is not written in the FIFO circuit due to insufficient empty space.

In such a case, it is necessary that the controller read the same image data as the previous time one more time when the amount of the empty region of the FIFO circuit becomes a predetermined value or more next, specify the image data not written in the FIFO circuit at the previous time in the read image data, and perform control to write only the specified image data into the FIFO circuit. Therefore, there are the disadvantages that the control by the controller becomes complicated and the load of the controller becomes larger.

SUMMARY OF THE INVENTION

An object of the present invention is to provide a storage device and an image data processing apparatus enabling input control of the FIFO circuit simply.

According to a first aspect of the present invention, there is provided a storage device comprising a data output circuit for outputting a data having a data length indicated by one read indication signal among a plurality of read indication signals giving different data lengths of data output, in response to one read output request; a memory circuit for receiving and storing the data output from the data output circuit; and a control circuit for outputting the output request by a number of times in response to the data length indicated by the read indication signal to the data output circuit when a predetermined amount of an empty region is generated in said memory circuit.

Preferably, the control circuit outputs the output request by a number of times in response to the data length indicated by the read indication signal to the data output circuit so that all of the data output from the data output circuit to the memory circuit by the output request is written in the entire region of the empty region.

Preferably, the memory circuit comprises a first-in first-out (FIFO) circuit.

Preferably, the control circuit outputs the output request for a number of times in response to the data length indicated by the read indication signal to the data output circuit when half of a memory region in the memory circuit becomes empty.

According to a second aspect of the present invention, there is provided an image data processing apparatus, comprising a first memory circuit capable of storing a plurality of image data having different data lengths of valid pixel data, output in accordance with one read request; a second memory circuit for receiving and storing the valid pixel data output from the first memory circuit; and a control circuit for outputting the read request by a number of times in accordance with the data length to the first memory circuit when a predetermined amount of an empty region is generated in the second memory circuit.

Preferably, the control circuit outputs the read request for a number of times in accordance with the data length to the first memory circuit so that all of the pixel data output from the first memory circuit to the second memory circuit by the read request is written in the entire region of the empty region in the second memory circuit.

Preferably, it further comprises an image processing circuit for performing image processing based on pixel data read from the second memory circuit.

Preferably, it further comprises a rearrangement circuit for rearranging image data including pixel data read from the second memory circuit in pixel data units and generating image data for being input to the image processing circuit when a data length of the image data read from the first memory means and a data length of image data including the pixel data to be input to the image processing circuit are different.

Preferably, the first memory circuit comprises an FIFO circuit.

According to a third aspect of the present invention, there is an image data processing circuit for performing rendering processing by using polygon rendering data including three-dimensional coordinates (x, y, z), R(red), G(green) and B(blue) data, texture homogenous coordinates (s, t), and a homogeneous term q with respect to vertexes of a unit graphic, comprising a first memory circuit for storing display data, and texture data required by at least one graphic element and defined a data amount of valid pixel data read by one read request; a second memory circuit for receiving and storing the valid pixel data read from the first memory circuit; an interpolation data generation circuit for interpolating polygon rendering data of vertexes of the unit graphic and generating interpolating data of pixels positioned inside the unit graphic; a texture processing circuit for generating "s/q" and "t/q" by dividing the texture homogeneous coordinates (s, t) included in the interpolation data by the homogeneous term q and generating display data by performing applying the texture data read from the first memory circuit on the surface of graphic elements by using a texture address in response to the "s/q" and "t/q"; a control circuit for outputting the read request by a number of times in accordance with the data amount to the first memory circuit when a predetermined amount of an empty region is generated in the second memory circuit; and an interface circuit for outputting pixel data read from the second memory circuit.

Preferably, the control circuit outputs the read request by a number of times in accordance with the data amount to the first memory circuit so that all of the pixel data output from the first memory circuit to the second memory circuit by the read request is written in the entire region of the empty region.

Preferably, it further comprises a data rearrangement circuit for rearranging the pixel data input from the second memory circuit in accordance with a signal processing mode of the interface circuit and outputting the rearranged pixel data to the interface circuit.

Preferably, the first memory circuit comprises an FIFO circuit.

Preferably, the second memory circuit comprises a DRAM.

BRIEF DESCRIPTION OF THE DRAWINGS

These and other objects and features of the present invention will become clearer from the following description of the preferred embodiments given with reference to the accompanying drawings, in which:

FIGS. 12A to 12E are views for explaining the operation of a "host to local" transfer mode in a case where a data length of one pixel in the data rearrangement unit shown in FIG. 2 is 32 bits;

FIGS. 13A to 13E are views for explaining the operation of a "host to local" transfer mode in a case where a data length of one pixel in the data rearrangement unit shown in FIG. 2 is 32 bits;

FIG. 19 is a view for explaining the operation of a "local to host" transfer mode in the data rearrangement unit shown in FIG. 2;

FIGS. 20A to 20I are views for explaining the operation of a "local to host" transfer mode in the data rearrangement unit shown in FIG. 2;

FIGS. 21A to 21I are views for explaining the operation of a "local to host" transfer mode in the data rearrangement unit shown in FIG. 2;

FIG. 26 is a view for explaining the relationship between a number of read instructions indicated in a read request of a control signal to be output from a controller shown in FIG. 8 to an address generation unit and a data length of one pixel;

FIGS. 27A to 27D are views for explaining color data read from a DRAM by one read operation when the data length of one pixel is 32 bits, 16 bits, 8 bits, and 4 bits; and FIG. 28 is a view of the system configuration showing the basic concept of a three-dimensional computer graphics system.

DESCRIPTION OF THE PREFERRED EMBODIMENTS

Below, preferred embodiments will be described with reference to the accompanying drawings.

In the present embodiment, a three-dimensional computer graphics system which displays a desired three-dimensional image of any three-dimensional object model on a CRT or other display used for personal computers etc. will be explained below.

Figure 1:
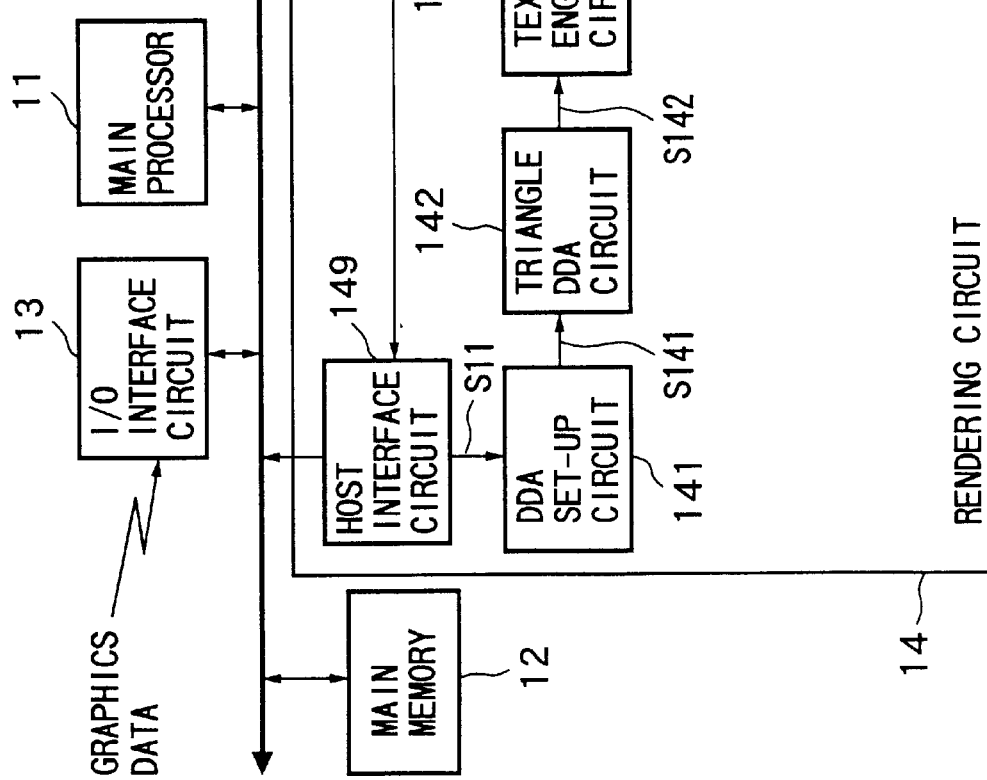
FIG. 1 Is a block diagram of the configuration of a three-dimensional computer graphics system according to the present invention.

FIG. 1 is a view of the system configuration of a three-dimensional computer graphics system 10 as an image processing apparatus according to the present invention.

In the three-dimensional computer graphics system 10, a three-dimensional model is expressed by a composite of triangular unit graphics (polygons). By drawing the polygons, this system can decide the color of each pixel on the display screen and perform polygon rendering for display on the screen.

In the three-dimensional computer graphics system 10, a three-dimensional object is expressed by using a z-coordinate for indicating the depth in addition to the (x, y) coordinates for indicating positions on a two-dimensional plane. Any one point of the three dimensional space can be expressed by the three coordinates (x, y, z).

As shown in FIG. 1, in the three-dimensional computer graphics system 10, a main processor 11, a main memory 12, an I/O interface circuit 13, and a rendering circuit 14 are connected via a main bus 15.

Below, the operations of the components will be explained.

The main processor 11, for example, in accordance with the state of progress in an application program, reads the necessary graphic data from the main memory 12, performs clipping, lighting, geometrical processing, etc. on the graphic data, and generates polygon rendering data. The main processor 11 outputs the polygon rendering data S11 to the rendering circuit 14 via the main bus 15.

The I/O interface circuit 13 receives as input control information of motions or the polygon rendering data from the outside in accordance with need and outputs the same to the rendering circuit 14 via the main bus 15.

Here, the polygon rendering data includes data of each of the three vertexes (x, y, z, R, G, B, s, t, q) of the polygon.

Here, the (x, y, z) data indicates the three-dimensional coordinates of a vertex of the polygon, and (R, G, B) data indicates the luminance values of red, green, and blue at the three-dimensional coordinates, respectively.

Among the (s, t, q) data, the (s, t) indicates homogeneous coordinates of a corresponding texture and the q indicates the homogenous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer 147a.

Namely, the polygon rendering data indicates physical coordinate values of the vertexes of a triangle and values of colors of the vertexes and texture.

The rendering circuit 14 will be explained in detail below.

As shown in FIG. 1, the rendering circuit 14 comprises a host interface circuit 149, a digital differential analyzer (DDA) set-up circuit 141, a triangle DDA circuit 142, a texture engine circuit 143, a memory interface (I/F) circuit 144, a cathode ray tube (CRT) control circuit 145, a random access memory (RAM) DAC circuit 146, a dynamic random access memory (DRAM) 147, and a static random access memory (SRAM) 148.

In the rendering circuit 14 of the present embodiment, a logic circuit and a DRAM 147 for storing at least display data and texture data are installed together in a single semiconductor chip.

DRAM 147

The DRAM 147 functions as a texture buffer 147a, a display buffer 147b, a z-buffer 147c, and a texture color look-up table (CLUT) buffer 147d.

Also, the DRAM 147 is divided into a plurality of modules (four in the present embodiment) having the same function, which will be explained later on.

Furthermore, in the DRAM 147, indexes of index colors and color look-up table values therefor are stored in the texture CLUT buffer 147d so as to store texture data as much as possible.

The indexes and color look-up table values are used for texture processing. Namely, a texture element is normally expressed by the total 24 bits of the 8 bits of each of R, G, and B. With this, however, the amount of data swells, so one color is selected from, for example, 256 colors selected in advance and that data is used for the texture processing. As a result, with 256 colors, the texture elements can be expressed by 8 bits. A conversion table from the indexes to an actual color is necessary, however, the higher the resolution of the texture, the more compact the texture data can become.

Due to this, compression of the texture data becomes possible and the built-in DRAM can be used efficiently.

Further, depth information of the object to be drawn is stored in the DRAM 147 in order to perform hidden plane processing simultaneously and in parallel with the drawing.

Note that as a method of storing the display data, the depth data, and the texture data, for example, the display data is stored at a predetermined position in the memory block, for example, continuously from the top, then the depth data is stored, and then the texture data is stored in continuous address spaces for each type of texture in the remaining empty region.

Figure 2:
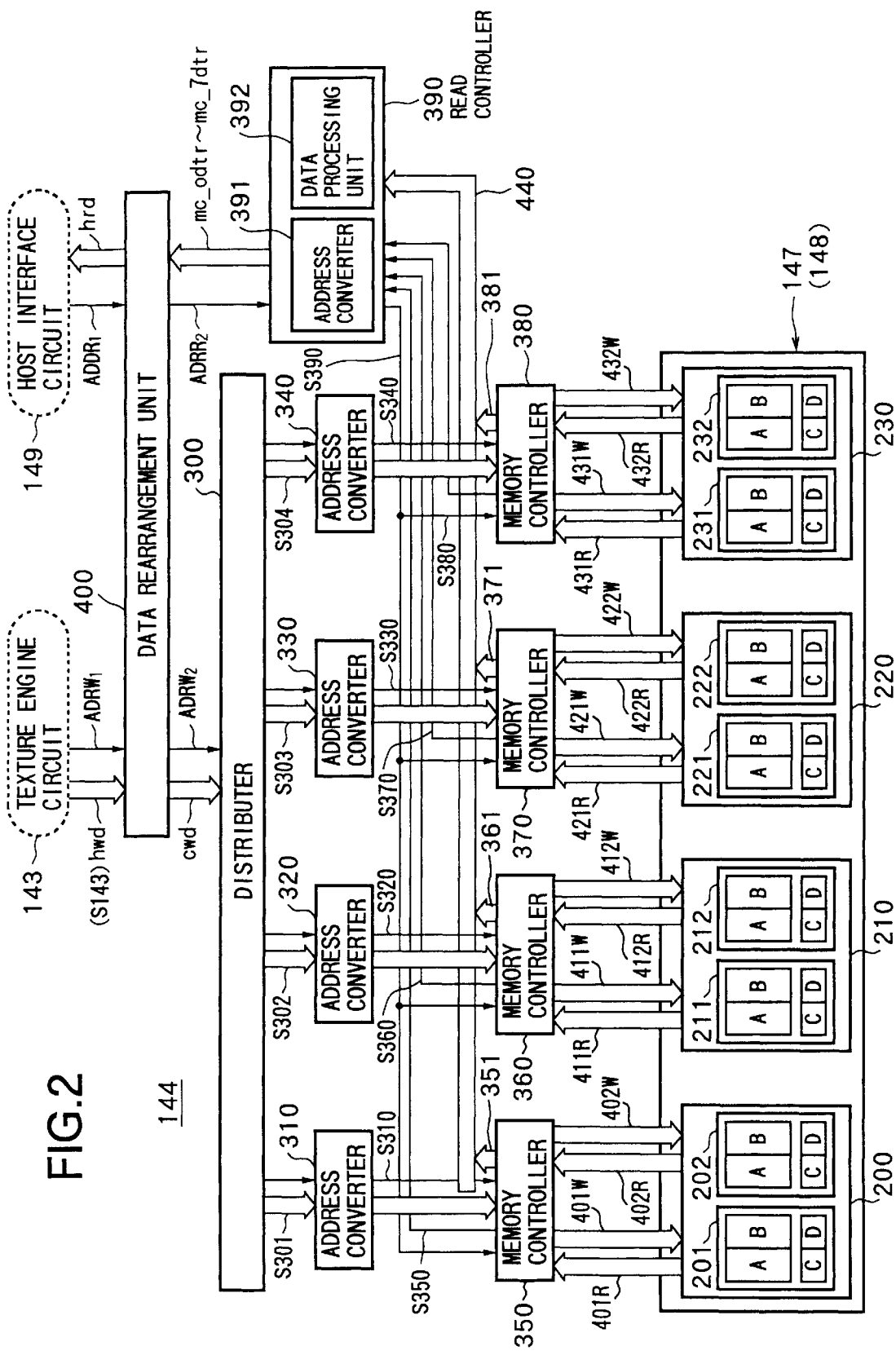
FIG. 2 is a block diagram of a specific example of the configuration of a DRAM, SRAM, and memory I/F circuit for accessing the DRAM and SRAM in the rendering circuit according to the present invention.

FIG. 2 is a block diagram of a specific example of the configuration of the DRAM 147, the SRAM 148, and the memory I/F circuit 144 for accessing the DRAM 147 and the SRAM 148.

As shown in FIG. 2, the DRAM 147 and the SRAM 148 shown in FIG. 1 are divided into four memory modules 200, 210, 220, and 230, as explained above.

The memory module 200 comprises memories 201 and 202.

The memory 201 comprises banks 201A and 201B comprising a part of the DRAM 147 and banks 201C and 201D comprising a part of the SRAM 148.

Also, the memory 202 comprises banks 202A and 202B comprising a part of the DRAM 147 and the banks 202C and 202D comprising a part of the SRAM 148.

Note that the banks 201C, 201D, 202C, and 202D comprising the SRAM 148 are simultaneously accessible.

The memory module 210 comprises memories 211 and 212.

The memory 211 comprises banks 211A and 211B comprising a part of the DRAM 147 and banks 211C and 211D comprising a part of the SRAM 148.

Also, the memory 212 comprises banks 212A and 212B comprising a part of the DRAM 147 and banks 212C and 212D comprising a part of the SRAM 148.

Note that the banks 211C, 211D, 212C, and 212D comprising the SRAM 148 are simultaneously accessible.

The memory module 220 comprises memories 221 and 222.

The memory 221 comprises banks 221A and 221B comprising a part of the DRAM 147 and banks 221C and 221D comprising a part of the SRAM 148.

Also, the memory 222 comprises banks 222A and 222B comprising a part of the DRAM 147 and banks 222C and 222D comprising a part of the SRAM 148.

Note that the banks 221C, 221D, 222C, and 222D comprising the SRAM 148 are simultaneously accessible.

The memory module 230 comprises memories 231 and 232.

The memory 231 comprises banks 231A and 231B comprising a part of the DRAM 147 and banks 231C and 231D comprising a part of the SRAM 148.

Also, the memory 232 comprises banks 232A and 232B comprising a part of the DRAM 147 and banks 232C and 232D comprising a part of the SRAM 148.

Note that the banks 231C, 231D, 232C, and 232D comprising the SRAM 148 are simultaneously accessible.

Here, each of the memory modules 200, 210, 220, and 230 has all of the functions of the texture buffer 147a, the display buffer 147b, the z-buffer 147c, and the texture CLUT buffer 147d shown in FIG. 1.

Namely, each of the memory modules 200, 210, 220, and 230 stores all of the texture data, the drawing data ((R, G, B) data), the z-data, and the texture color look-up table data of corresponding pixels.

Note that the memory modules 200, 210, 220, and 230 store data of different pixels from each other.

Here, the texture data, the drawing data, the z-data, and the texture color look-up table data for 16 pixels being processed simultaneously are stored in mutually different banks 201A, 201B, 202A, 202B, 211A, 211B, 212A, 212B, 221A, 221B, 222A, 222B, 231A, 231B, 232A, and 232B.

Due to this, the memory I/F circuit 144 can simultaneously access the DRAM 147 for data of, for example, 8 (X-direction)×2 (Y-direction) pixels, that is, 16 pixels.

Note that it becomes possible to simultaneously read data of, for example, 8 (X-direction)×1 (Y-direction) pixels, that is, 8 pixels.

Note that the memory I/F circuit 144, as will be explained later on, accesses (writes) the DRAM 147 based on so-called predetermined interleave type addressing.

Figure 3A:
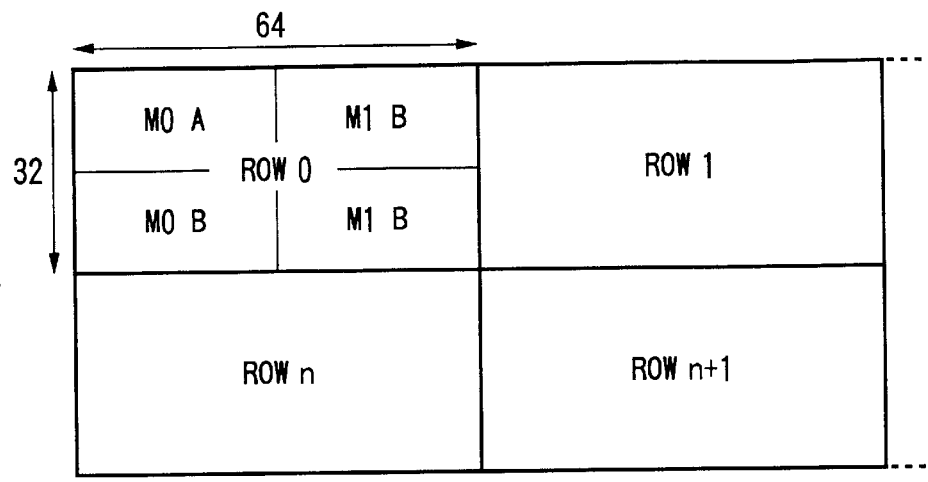
FIGS. 3A and 3B are schematic views of an example of the configuration of a DRAM buffer according to the present invention.
Figure 3B:
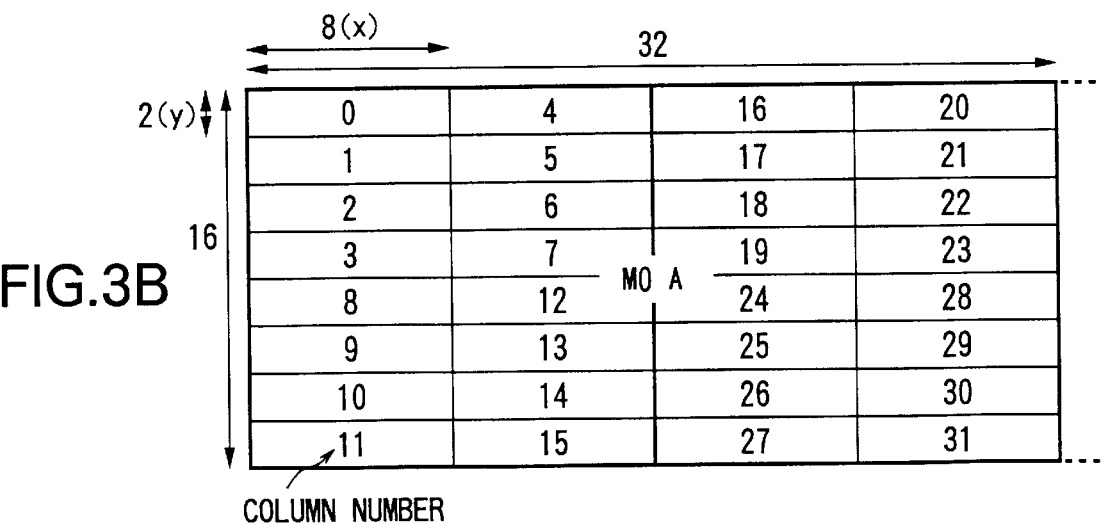

FIGS. 3A and 3B are schematic views of an example of the configuration of the DRAM 147 serving as a buffer (for example, a texture buffer).

As shown in FIGS. 3A and 3B, data accessed in a 2×8 pixel region is stored in a region indicated by a page (row) and a block (column).

Each of the rows ROW0 to ROWn+1 are, as shown in FIG. 3A, respectively divided into 4 columns (blocks) M0A, M0B, M1A, and M1B.

Accesses are performed in regions of an even number of boundaries in an X-direction and in the Y-direction when writing, and boundaries of multiples of 8 pixels each in an X-direction and of any number of boundaries in a Y-direction when reading.

Note that the texture data respectively stored in the banks 201A, 201B, 202A, 202B, 211A, 211B, 212A, 212B, 221A, 221B, 222A, 222B, 231A, 231B, 232A, and 232B are stored in the banks 201C, 201D, 202C, 202D, 211C, 211D, 212C, 212D, 221C, 221D, 222C, 222D, 231C, 231D, 232C, and 232D.

Next, storage patterns of the texture data in the texture buffer 147a based on the interleave type addressing will be explained in further detail with reference to FIGS. 4 to 6.

Figure 4:
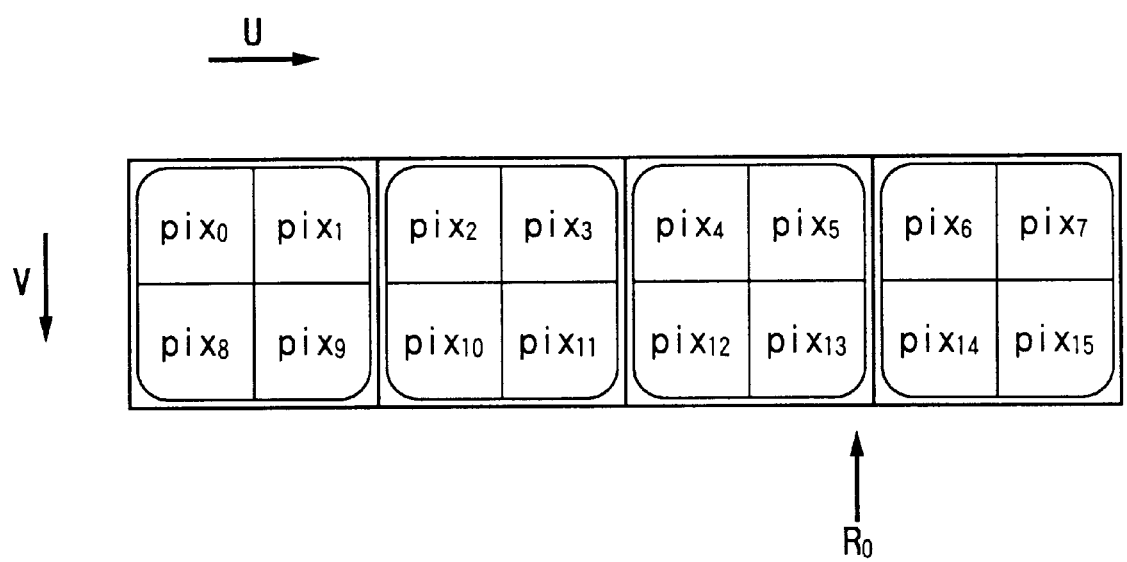
FIG. 4 is a view for explaining simultaneously accessed color data included in texture data.
Figure 5:
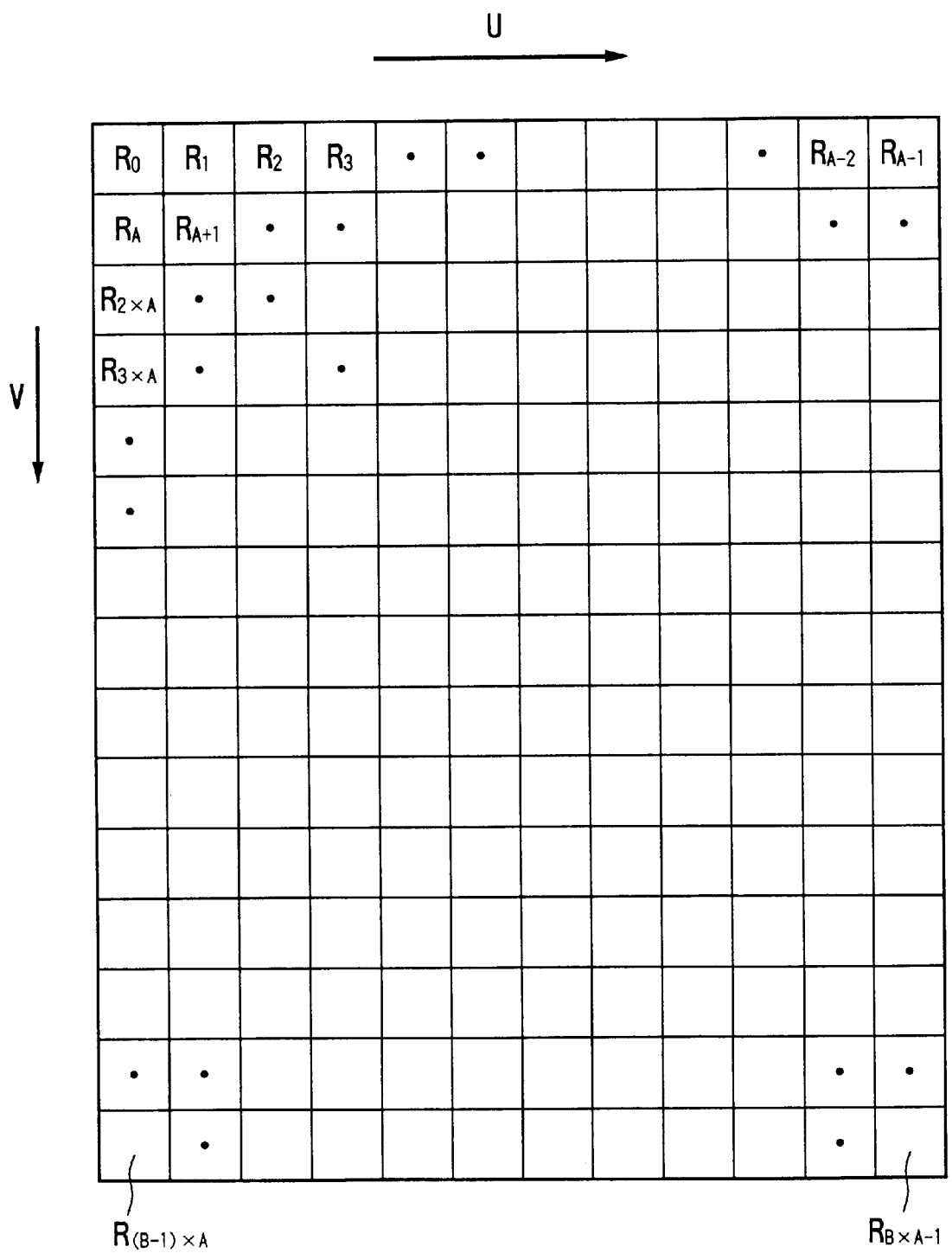
FIG. 5 is a view for explaining unit blocks comprising texture data.
Figure 6:
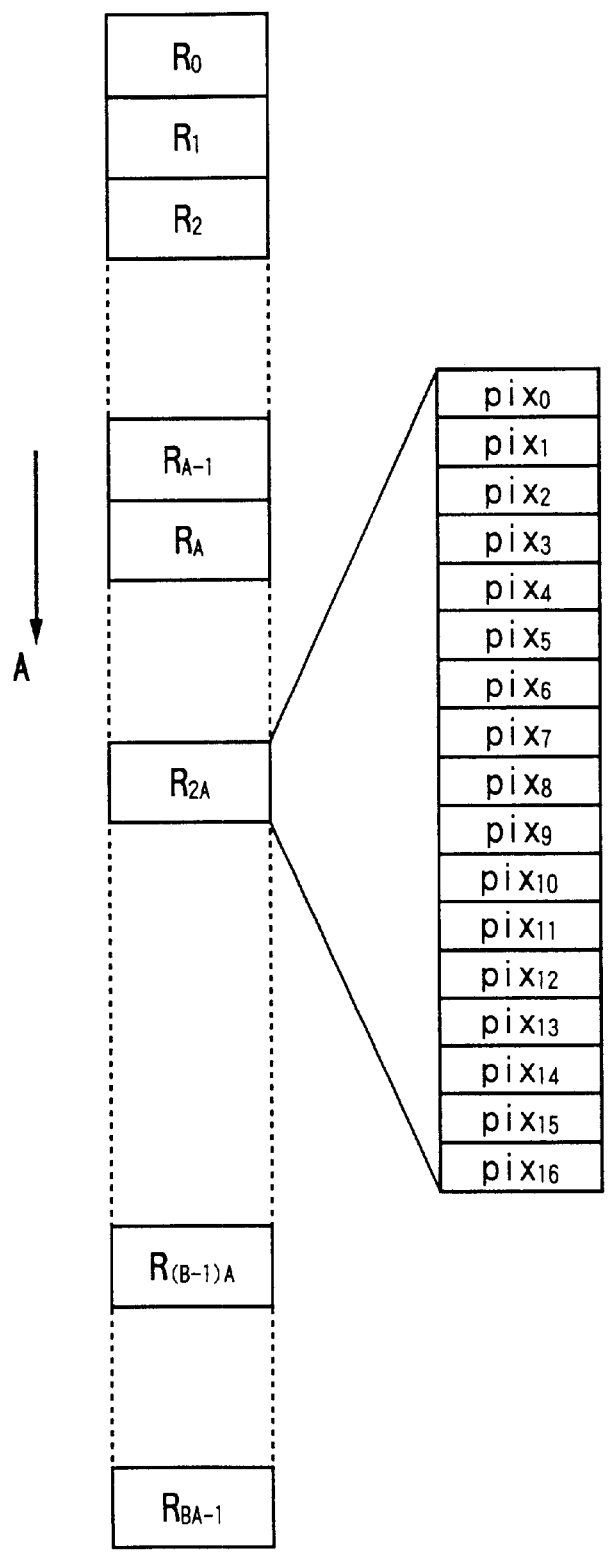
FIG. 6 is a View for explaining an address space of the texture buffer.

FIG. 4 is a view for explaining simultaneously accessible pixel data included in the texture data, FIG. 5 is a view for explaining unit blocks comprising texture data, and FIG. 6 is a view for explaining an address space of the texture buffer.

In the present embodiment, as shown in FIG. 4, pixel data $pix_0$ to $pix_{15}$ included in the texture data, arranged in a 2×8 matrix, and indicating color data of pixels are simultaneously accessible.

The pixel data $pix_0$ to $pix_{15}$ have to be stored in different banks of the SRAM 148 comprising the texture buffer 147a.

In the present embodiment, the pixel data $pix_0$, $pix_1$, $pix_8$, and $pix_9$ are respectively stored in the banks 201C and 201D of the memory 201 and banks 202C and 202D of the memory 202 shown in FIG. 2. Also, the pixel data $pix_2$, $pix_3$, $pix_{10}$, and $pix_{11}$ are respectively stored in the banks 211C and 211D of the memory 211 and banks 212C and 212D of the memory 212 as shown in FIG. 2. The pixel data $pix_4$, $pix_5$, $pix_{12}$, and $pix_{13}$ are respectively stored in the banks 221C and 221D of the memory 221 and banks 222C and 222D of the memory 222 as shown in FIG. 2. Further, the pixel data $pix_6$, $pix_7$, $pix_{14}$, and $pix_{15}$ are respectively stored in the banks 231C and 231D of the memory 231 and the banks 232C and 232D of the memory 232 as shown in FIG. 2.

In the present embodiment, the set of pixel data $pix_0$ to $pix_{15}$ of the pixels positioned inside a block region and simultaneously processed is called a unit block $R_i$. For example, texture data indicating one image is composed of unit blocks $R_0$ to $R_{BA-1}$ arranged in a B×A matrix, as shown in FIG. 5.

The unit blocks $R_0$ to $R_{BA-1}$ are, as shown in FIG. 6, stored in the DRAM 147 comprising the texture buffer 147a so as to have continuous addresses in a one-dimensional address space. Also, the pixel data $pix_0$ to $pix_{15}$ in each of the unit blocks $R_0$ to $R_{BA-1}$ are stored in mutually different banks of the SRAM 148 so as to have continuous addresses in a one-dimensional address space.

Namely, a unit block composed of pixel data which are simultaneously accessible is stored in the texture buffer 147a so as to have continuous addresses in a one-dimensional address space.

Host Interface Circuit 149

A host interface circuit 149 is connected to the main bus 15 outside the rendering circuit 14 and connected to the DDA set-up circuit 141 and the memory I/F circuit.

The host interface circuit 149, which will be explained later on, is an interface for communication between the memory I/F circuit 144 with the main processor and I/O interface circuit 13.

DDA Set-up Circuit 141

The DDA set-up circuit 141 performs linear interpolation on the values of the vertexes of the triangle on the physical coordinate system in a latter triangle DDA circuit 142. The DDA set-up circuit 141, prior to obtaining information of the color and depth of the respective pixels inside the triangle, performs a set-up operation for obtaining the sides of the triangle and the difference in a horizontal direction for the data (z, R, G, B, s, t, q) indicated by the polygon rendering data S11.

Specifically, this set-up operation uses values of the starting point and the end point and the distance between two points to calculate the variation of the value to find movement for a unit length.

The DDA set-up circuit 141 outputs the calculated variation data S141 to the triangle DDA circuit 142.

Triangle DDA Circuit 142

The triangle DDA circuit 142 uses the variation data S141 input from the DDA set-up circuit 141 to calculate the (z, R, G, B, s, t, q) data after linear interpolation of each pixel inside the triangle.

The triangle DDA circuit 141 outputs the data (x, y) for each pixel and the (z, R, G, B, s, t, q) data at the (x, y) coordinates to the texture engine circuit 143 as DDA data (interpolation data) S142.

In the present embodiment, the triangle DDA circuit 142 outputs the DDA data S142 of 8 (=2×4) pixels positioned inside a block being processed in parallel to the texture engine circuit 143.

Texture Engine Circuit 143

The texture engine circuit 143 performs the calculation of "s/q" and "t/q", calculation of the texture coordinate data (u, v), and reading of the data (R, G, B) from the texture buffer 147a successively in a pipeline format.

Note that the texture engine circuit 143 performs processing on the 8 pixels positioned inside a predetermined block simultaneously in parallel.

The texture engine circuit 143 performs an operation for dividing the data s by the data q and the operation for dividing the data t by the data q with respect to the (s, t, q) data indicated by the DDA data S142.

The texture engine circuit 143 is provided with eight of the not shown division circuits and performs the division "s/q" and "t/q" simultaneously on the 8 pixels.

Also, the texture engine circuit 143 respectively multiplies the texture sizes USIZE and VSIZE with the division results "s/q" and "t/q" to generate the texture coordinate data (u, v).

The texture engine circuit 143 outputs a read request including the generated texture coordinate data (u, v) to the SRAM 17 or DRAM 16 via the memory I/F circuit 144. As the result the texture engine circuit 143 obtains the data S148 (R, G, B) stored at the texture address corresponding to the data (s, t) by reading the texture data stored in the SRAM 148 or in the texture buffer 147a via the memory I/F circuit 144.

Here, the texture data stored in the texture buffer 147a is stored in the SRAM 148, as explained above.

The texture engine circuit 143 generates the color data S143 by blending the (R, G, B) data in the read data S148 (R, G, B) and the (R, G, B) data included in the DDA data S142 from the former triangle DDA circuit 142.

The texture engine circuit 143 outputs the color data S143 to the memory I/F circuit 144.

Note that in the texture buffer 147a, MIPMAP (textures for a plurality of resolutions) and other texture data corresponding to a plurality of reducing rates are stored. Here, texture data of which reducing rate to use is determined for the above triangular unit using a predetermined algorithm.

In the case of a full color mode, the texture engine circuit 143 directly uses the data (R, G, B) read from the texture buffer 147a.

On the other hand, in the case of an index color mode, the texture engine circuit 143 reads a color look-up table (CLUT), prepared in advance, from the texture CLUT buffer 147d, transfers and stores the same in the built-in SRAM, and uses the color look-up table to obtain the data (R, G, B) corresponding to the color index read from the texture buffer 147a.

Memory I/F Circuit 144

The memory I/F circuit 144 compares the z-data corresponding to the color data S143 input from the texture engine circuit 143 with the z-data stored in the z-buffer 147c and judges whether the image drawn by the input pixel (image) data S143 is positioned closer to the viewing point than the image written in the display buffer 147b the previous time. When it is judged that the image drawn by the input color data S143 is positioned closer, the memory I/F circuit 144 updates the z-data stored in the z-buffer 147c by the z-data corresponding to the pixel data S143.

Also, the memory I/F circuit 144 writes the (R, G, B) data to the display buffer 147b.

Furthermore, the memory I/F circuit 144 reads the (R, G, B) data S148 stored in the SRAM 148 when the SRAM 148 receives a read request including the generated texture coordinates data (u, v) from the texture engine circuit 143.

Also, when receiving a request to read the display data from the CRT control circuit 145, the memory I/F circuit 144 reads the display data by a certain amount in units of for example 8 pixels or 16 pixels from the display buffer 147b in accordance with the request.

The memory I/F circuit 144 also outputs the data read from the DRAM 147 to the host interface circuit 149.

The memory I/F circuit 144 accesses (writes to or reads from) the DRAM 147 and SRAM 148, but the write path and read path are configured as different paths.

Namely, when writing, a write address ADRW and color data cdw are processed by a write system circuit and written to the DRAM 147, while when reading, they are processed by a read system circuit and read from the DRAM 147 or SRAM 148.

The memory I/F circuit 144 accesses the DRAM 147 based on addressing in a predetermined interleave mode in units of 16 pixels when writing and 8 pixels when reading.

Below, a specific example of the configuration of the memory I/F circuit 144 will be explained with reference to FIG. 2.

The memory I/F circuit 144 comprises, as shown in FIG. 2, a distributer 300, address converters 310, 320, 330, and 340, memory controller 350, 360, 370, and 380, a read controller 390, and a data rearrangement unit 400.

[Distributer 300]

A distributer 300 receives as input color data cwd and a write address $ADRW_2$ for 8 pixels from the data rearrangement unit 400 when writing, generates color data for 16 pixels therefrom, divides the same into four image data S301, S302, S303, and S304 respectively composed of data for 4 pixels, and outputs the image data and the write address to the address converters 310, 320, 330, and 340.

Here, (R, G, B) data for 1 pixel is composed of 32 bits and z-data is composed of 32 bits.

[Address Converters 310, 320, 330, and 340]

When writing, the address converters 310, 320, 330, and 340 convert the addresses corresponding to the (R, G, B) data and the z-data input from the distributer 300 to addresses in the memory modules 200, 210, 220, and 230 and output the respectively converted addresses S310, S320, S330, and S340 and the divided image data to the memory controllers 350, 360, 370, and 380.

Figure 7:
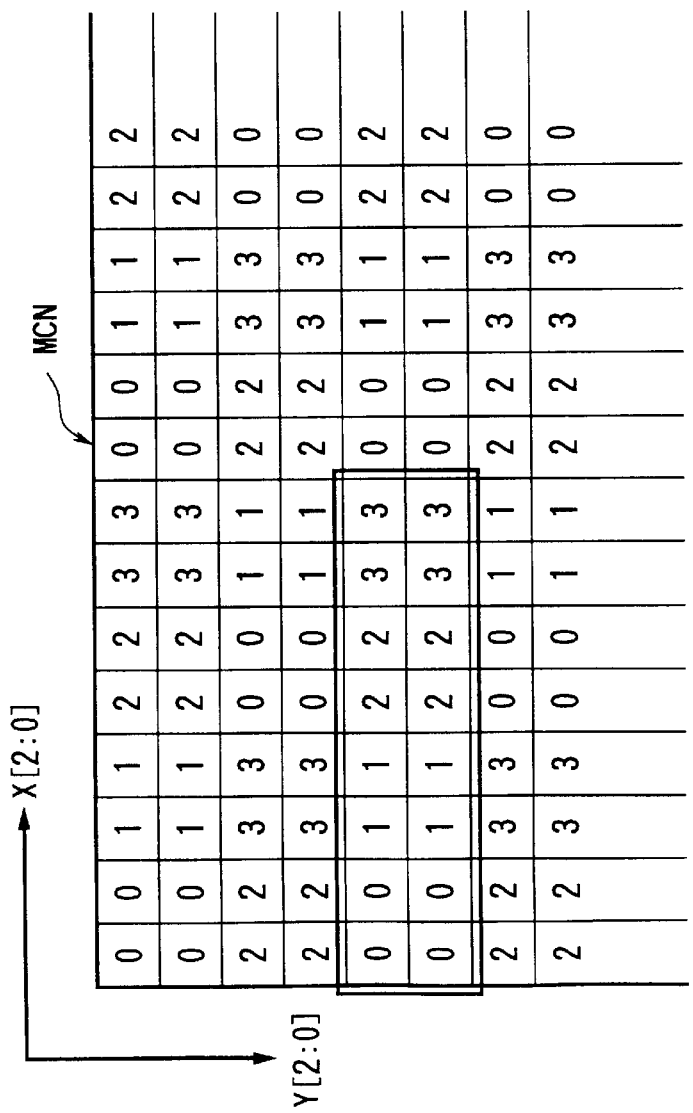
FIG. 7 is a view for explaining image data processing of a distributer in a memory I/F circuit according to the present invention.

FIG. 7 is a schematic view of the image data processing (pixel processing) of the distributer 300.

This figure corresponds to the above FIGS. 3A and 3B to 6. The distributer 300 performs image data processing for the DRAM 147 in order that data of, for example, 2×8 pixels, that is, 16 pixels, can be simultaneously accessed.

Then, the distributer 300 performs image data processing in order to give addressing for access (writing, reading) to a region of a boundary of 8 pixels in the X-direction and an even number of boundaries in the Y-direction.

As a result, in the DRAM 147, the top of access always becomes a memory cell number MCN "0", not "1", "2", or "3", so occurrence of page violations etc. can be prevented.

Also, the distributer 300 performs image data processing for the DRAM modules 220 to 230 in order that adjacent portions in a display region be arranged at different DRAM modules.

As a result, when drawing a plane such as a triangle, simultaneous processing on the plane is possible, so the frequency of operation of the respective DRAM modules becomes very high.

[Memory Controllers 350, 360, 370, and 380]

The memory controllers 350, 360, 370, and 380 are respectively connected to the memory modules 200, 210, 220, and 230 via a wiring group of the write system 401W, 402W, 411W, 412W, 421W, 422W, 431W, and 432W and a wiring group of the read system 401R, 402R, 411R, 412R, 421R, 422R, 431R, and 432R and control access to the memory modules 200, 210, 220, and 230 at the time of writing and reading.

Specifically, when writing, the memory controllers 350, 360, 370, and 380 are output from the distributer 300, and the (R, G, B) data and z-data for 4 pixels input from the address converters 350, 360, 370, and 380 are simultaneously written to the memory modules 200, 210, 220, and 230 via the wiring group of the write system 401W, 402W, 411W, 412W, 421W, 422W, 431W, and 432W.

At this time, for example, in the memory module 200, the (R, G, B) data and z-data for 1 pixel are stored in each of the banks 201A, 201B, 202A, and 202B. The same is true for the memory modules 210, 220, and 230.

Also, the memory controllers 350, 360, 370, and 380 output idle signals S350, S360, S370, and S380 to the read controller 390 as active when their own state machines are in an idle state. Receiving read addresses and a read request signal S391 by the read controller 390 in response to the idle signals S350, S360, S370, and S380, the memory controllers 350, 360, 370, and 380 read data via the wiring group of the read system 401R, 402R, 411R, 412R, 421R, 422R, 431R, and 432R and output the same to the read controller 390 via the wiring group of the read system 351, 361, 371, and 381 and a wiring group 440.

Note that, in this embodiment, the number of wires of the wiring group of the write system 401W, 402W, 411W, 412W, 421W, 422W, 431W, and 432W and the wiring group of the read system 401R, 402R, 411R, 412R, 421R, 422R, 431R, and 432R is 128 (128 bits). The number of wires of the wiring groups 351, 361, 371, and 381 of the read system is 256 (256 bits). The number of wires of the wiring group 440 of the read system is 1024 (1024 bits).

[Read Controller 390]

The read controller 390 is configured by an address converter 391 and a data processing unit 392.

When receiving a read address ADRR, if the address converter 391 receives all of the idle signals S350, S360, S370, and S380 from the memory controllers 350, 360, 370, and 380 as active, the address converter 391 outputs read addresses and a read request signal S391 to the memory controllers 350, 360, 370, and 380 in order to read data in units of 8 pixels or 16 pixels in response to the idle signals S350, S360, S370, and S380.

The data processing unit 392 receives as input the texture data, the (R, G, B) data, the z-data, and the texture color look-up table data in units of 8 pixels or 16 pixels read from the memory controllers 350, 360, 370, and 380 via the wiring group 440, performs a predetermined processing, then the data rearrangement unit 400 performs data rearrangement. The result is output to a requested destination, for example, to the host interface circuit 149.

Also, when reading data from one rectangular region in a memory region of the DRAM 147 and writing to another rectangular region, data transfer is performed via the read controller 390, data rearrangement unit 400, and distributer 300.

As explained above, when all of the memory controllers 350, 360, 370, and 380 are in an idle state, the read controller 390 outputs the read addresses and read request signal S391 to the memory controllers 350, 360, 370, and 380 and receives the read data, therefore can synchronize the read data.

Accordingly, the read controller 390 does not require a first-in first-out (FIFO) circuit or other holding circuit for temporarily holding data. Thus, the size of the circuit can be reduced.

[Data Rearrangement unit 400]

The data rearrangement unit 400 has three transfer modes, "host to local", "local to host", and "local to local" and performs data rearrangement in accordance with the respective transfer modes.

The data rearrangement unit 400 judges the transfer mode and a data length of one pixel based on, for example, a transfer mode indication signal and a pixel data length indication signal input from the texture engine circuit 143.

Note that as the data length of one pixel, there are, for example, 32 bits, 16 bits, 8 bits, and 4 bits.

Here, data lengths of one pixel of 32 bits and 16 bits are used for texture data etc., and data lengths of one pixel of 8 bits and 4 bits are used for index data etc.

The data rearrangement unit 400 generates, in the "host to local" transfer mode, the color data cwd having a 256-bit width and an address $ADRW_2$ including representative point coordinates (btrx, btry) and a valid flag btrvld from transfer data hwd (color data S143) having a 64-bit width and a write address $ADRW_1$ input from the texture engine circuit 143 and outputs the same to the distributer 300.

Also, the data rearrangement unit 400 generates, in the "local to host" transfer mode, an address $ADRR_2$ in accordance with an address ADRR1 input from the host interface circuit 149, generates transfer data hrd having a 64-bit width by packing 256 bits of color data mc_0dtr to mc_7dtr for 8 pixels input from the controller 390 by a read operation performed based on the address $ADRR_2$, and outputs the same to the host interface circuit 149.

Furthermore, the data rearrangement unit 400 in the "local to local" transfer mode, when reading data from one rectangular memory region in a memory region bf the DRAM 147 and transferring (writing) it to another rectangular memory region, receives as input the 256 bits of color data mc_0dtr to mc_7dtr for 8 pixels from the read controller 390, generates the color data cwr by shifting the same in accordance with origin coordinates of the rectangular memory region of the transfer destination, and outputs to the distributer 300 an address $ADRW_2$ including the representative point coordinates (btrx, btry) used in the write operation at the destination and the valid flag btrvld.

Figure 8:
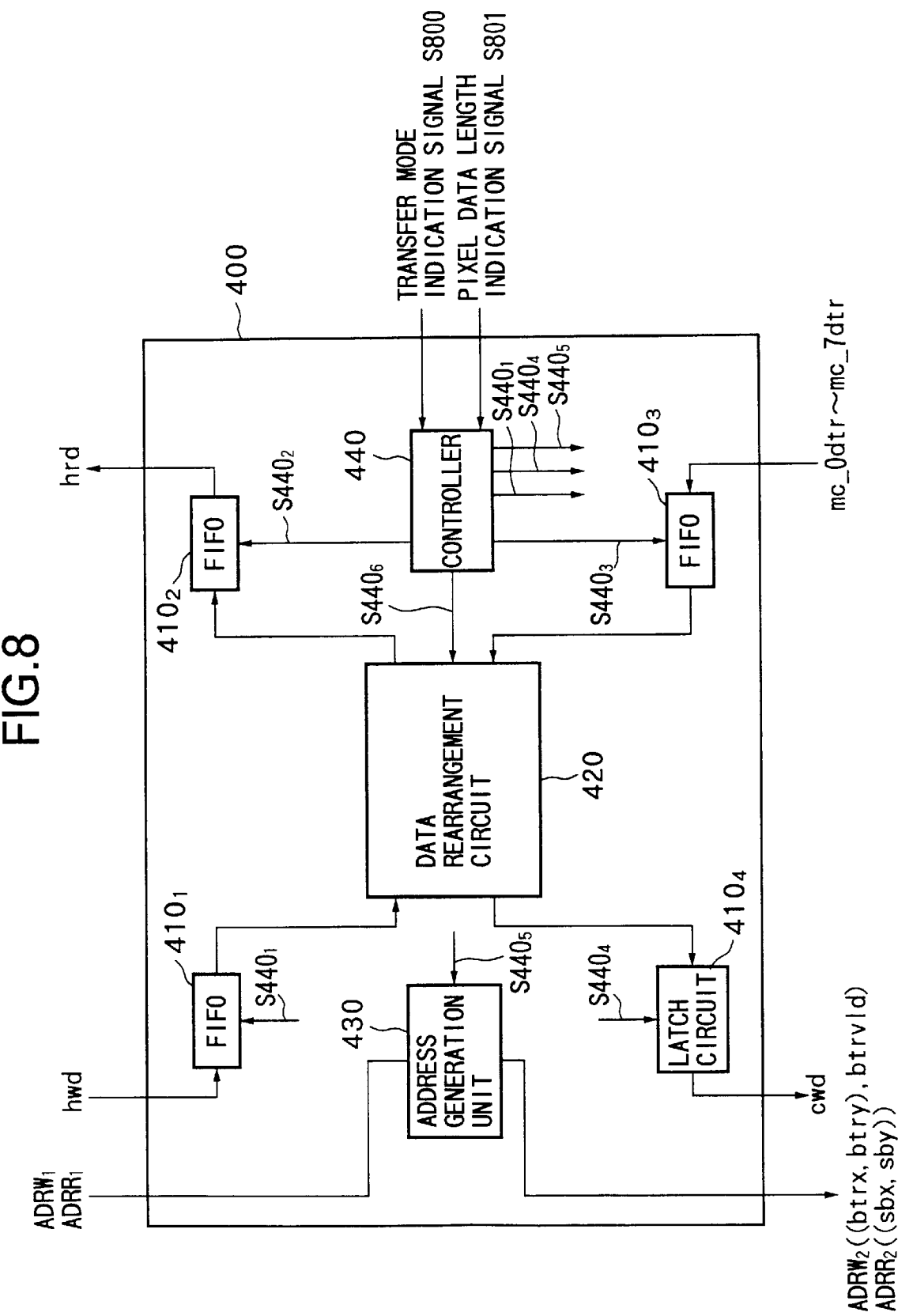
FIG. 8 is a view of the configuration of a data rearrangement unit 400 shown in FIG. 2.

FIG. 8 is a view of the configuration of the data rearrangement unit 400 shown in FIG. 2.

As shown in FIG. 8, the data rearrangement unit 400 comprises FIFO circuits $410_1$ to $410_3$, latch circuit $410_4$, data rearrangement circuit 420, address generation unit 430, and controller 440.

The FIFO circuit $410_1$ is, for example, an FIFO circuit having a 64-bit width and depth of three stages and, based on a control signal $S440_1$ from the controller 440, outputs the transfer data hwd having a 64-bit width input from the texture engine circuit 143 in an FIFO mode to the data rearrangement circuit 420.

The FIFO circuit $410_2$ is, for example, an FIFO circuit having a 64-bit width and depth of three stages and, based on a control signal $S440_2$ from the controller 440, outputs the transfer data hrd having a 64-bit width input from the data rearrangement circuit 420 in an FIFO mode to the host interface circuit 149.

The FIFO circuit $410_3$ is, for example, an FIFO circuit having a 64-bit width and depth of 16 stages and, based on a control signal $S440_3$ from the controller 440, outputs the 32 bits of color data mc_0dtr to mc_7dtr for 8 pixels input from the read controller 390 in an FIFO mode to the data rearrangement circuit 420.

The input of the color data mc_0dtr to mc_7dtr to the FIFO circuit 4103 is, as will be explained later on, controlled by the controller 440.

The latch circuit $410_4$ has, for example, a 256-bit width and, based on a control signal $S440_4$ from the controller 440, outputs the color data cwd_a having a width of 256 bits input from the data rearrangement circuit 420 to the distributer circuit 300 shown in FIG. 2.

Figure 9:
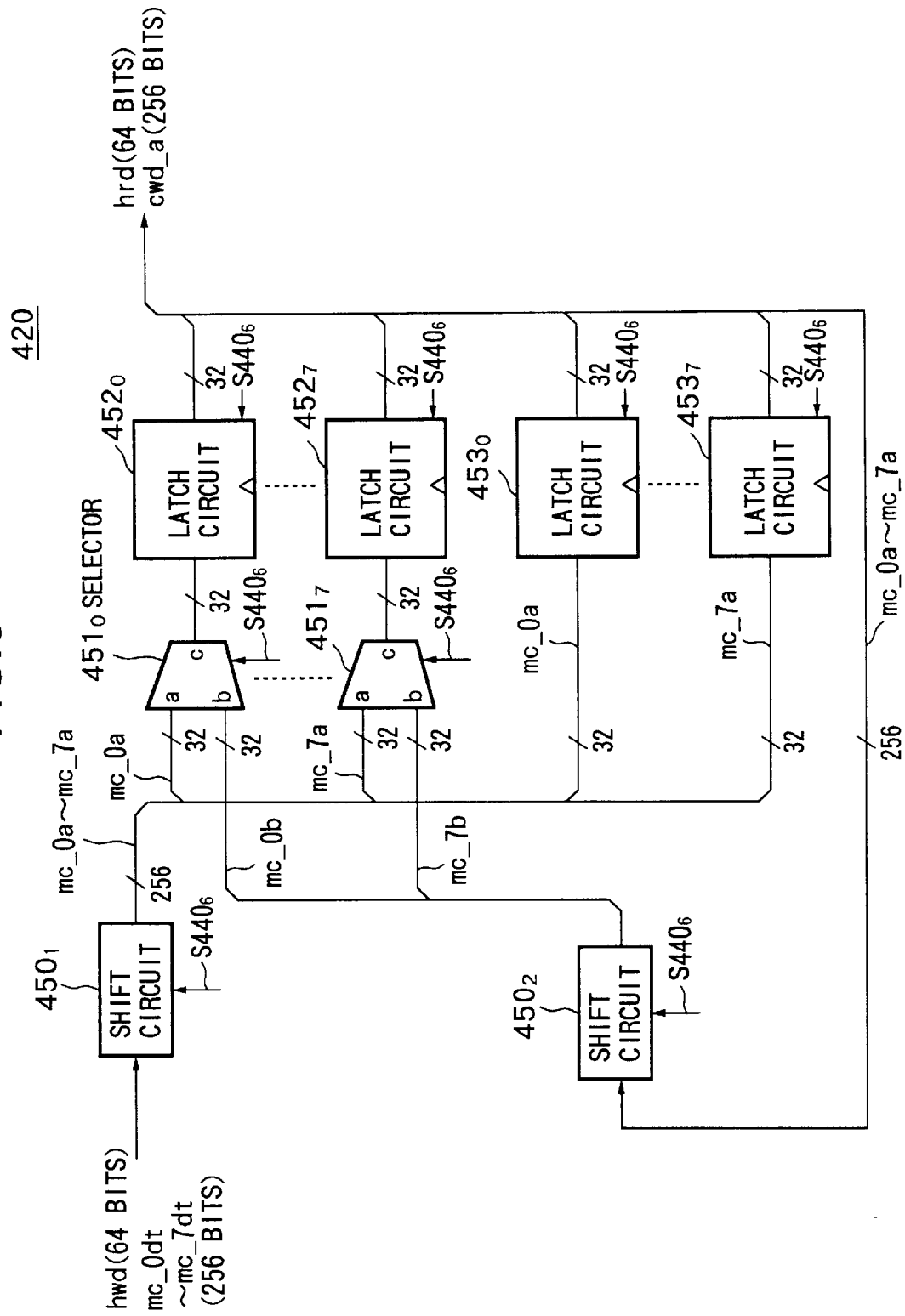
FIG. 9 is a view of the configuration of a data rearrangement unit 420 shown in FIG. 8.

FIG. 9 is a view of the configuration of a data rearrangement circuit 420 shown in FIG. 8.

As shown in FIG. 9, the data rearrangement circuit 420 comprises shift circuits $450_1$ and $450_2$, selectors $451_0$ to $451_7$, latch circuits $452_0$ to $452_7$, and latch circuits $453_0$ to $453_7$.

When performing the "host to local" transfer, the shift circuit $450_1$, based on a control signal $S440_6$ input from the controller 440, receives as input the transfer data hwd having a 64-bit width, that is, 56 bits (8 pixels) of color data wherein 2 pixels of color data are arranged on the LSB side from the texture engine circuit 143 and outputs the 256 bits of color data mc_0a to mc_7a generated by shifting the color data in units of 32 bits.

The selectors $451_0$ to $451_7$, based on the control signal $S440_6$ from the controller 440, selects one of the 32 bits of color data mc_0a to mc_7a input via an input terminal a and the 32 bits of color data mc_0a to mc_7 input via an input terminal b and output from an output terminal a to the latch circuits $452_0$ to $452_7$.

The latch circuits $452_0$ to $452_7$ based on the control signal $S440_6$, outputs the 32 bits of color data output from the output terminals c of the respective selectors $451_0$ to $451_7$ to the FIFO circuit $410_2$ or the latch circuit $410_4$ shown in FIG. 8.

The latch circuits $453_0$ to $453_7$, based on the control signal $S440_6$, outputs the color data mc_0a to mc_7a input from the shift circuit $450_1$ to the shift circuit $450_1$ and the FIFO circuit $410_2$ or the latch circuit $410_4$ shown in FIG. 8.

Here, the 32 bits of output lines of the latch circuits $452_0$ to $452_7$ are the same as the 32 bits of output lines of the latch circuits $453_0$ to $453_7$. Control is performed to output the 32 bits of color data from one of the latch circuits $452_0$ to $452_7$ and the latch circuits $453_0$ to $453_7$.

The shift circuit $450_2$ outputs the 32 bits of color data mc_0b to mc_7b generated by shifting in units of 32 bits the 256 bits of color data input from the latch circuits $453_0$ to $453_7$ to the input terminals b of the respective selectors $451_0$ to $451_7$.

Below, the data rearrangement in the data rearrangement unit 400 and the address generation in the address generation unit 430 shown in FIG. 8 will be explained for each transfer mode.

Note that the writing to the DRAM 147 is, as explained above, performed in units of a rectangular memory region storing color data of 16 pixels by 8 pixels (X-direction)×2 pixels (Y-direction) based on a representative point. Reading from the DRAM 147 is performed in units of a rectangular memory region storing the color data of 8 pixels by 8 pixels (X-direction)×1 pixel (Y-direction) based on the representative point.

Also, for the address of the representative point, in a read operation, any address can be designated for the Y-direction, but only addresses of multiples of 8 may be designated for the X-direction. On the other hand, in a write operation, only multiples of 2 may be designated for the address of the representative point both in the X-direction and Y-direction.

In the rearrangement below, a case will be explained as an example of a read operation and write operation of color data being performed on a rectangular memory region 500 having a width of 3, a height of 3, and an origin coordinate of (5, 5) in the memory region of the DRAM 147 shown in FIG. 10.

<"Host to Local" Transfer Mode>

Below, an operation for transferring and writing the 32 bits of color data pix0 to pix 8 (data length of one pixel is 32 bits) for 8 pixels included in transfer data $hwd_0$ to $hwd_4$ having a 64-bit width shown in FIG. 11 input from the texture engine circuit 143 to the rectangular memory region 500 shown In FIG. 10.

Figure 10:
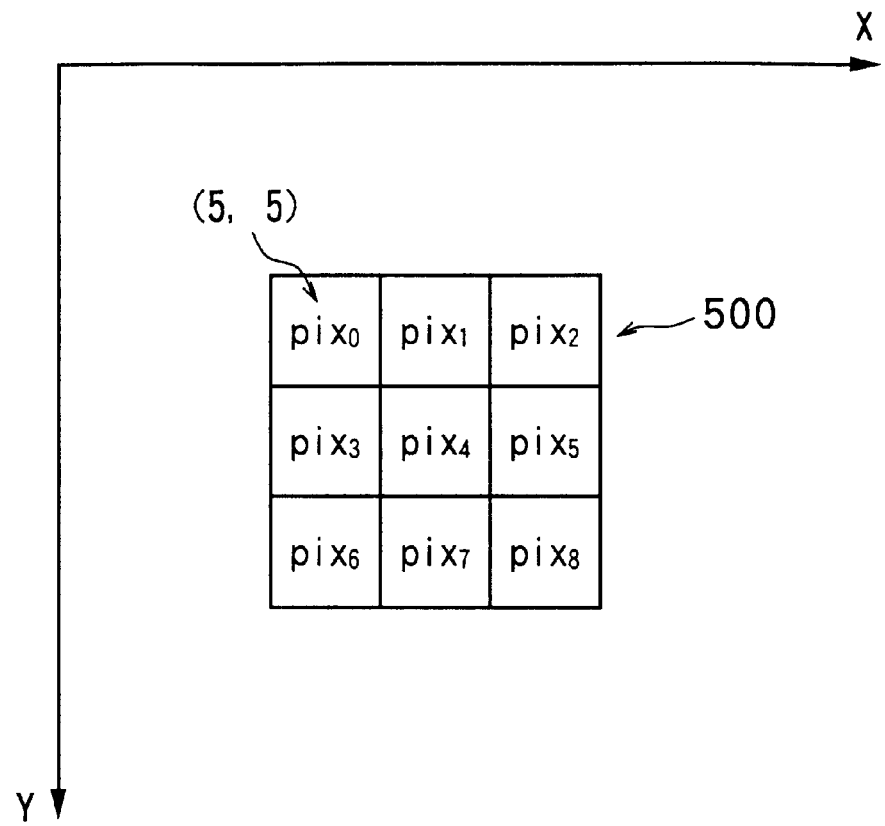
FIG. 10 is a view of a memory region inside a DRAM shown in FIG. 1.

In this case, the transfer data hwd is given in the order of increasing X-coordinates in the scanning line from the top left end point in FIG. 10 of the rectangular memory region 500. After finishing one scan line, data of the next scan line is given in the order of increasing X-coordinates. At this time, data of a different scan line is also given packed in the 64 bits.

Figure 11:
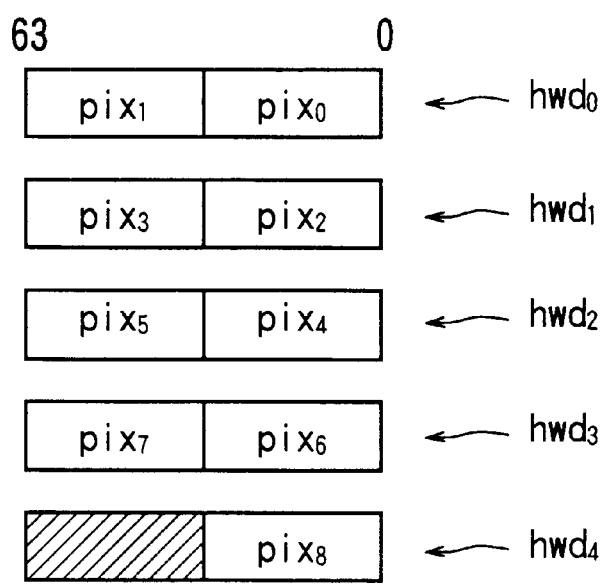
FIG. 11 is a view for explaining the operation of a "host to local" transfer mode in a case where a data length of one pixel in the data rearrangement unit shown in FIG. 2 is 32 bits.

First, the transfer data $hwd_0$ to $hwd_4$ having a 640-bit width shown in FIG. 11 from the texture engine circuit 143 is successively output to the data rearrangement circuit 420 via the FIFO circuit $410_1$ shown in FIG. 8.

Then, the 256 bits of color data comprising the color data pix0 and pix1 of the transfer data hwd0 arranged in order from the LSB are shifted in the shift circuit $450_1$ shown in FIG. 9 by exactly "1" toward the MSB in units of 32 bits as shown in FIG. 12A. The shifted color data $cwd\_a_0$ is output as color data $cwd_0$ shown in FIG. 13A from the latch circuits $453_0$ to $453_7$ shown in FIG. 9 and output to the distributer circuit 300 shown in FIG. 2 via the latch circuit $410_4$ shown in FIG. 8.

Next, the 256 bits of color data comprising the color data $pix_2$ and $pix_3$ of the transfer data hwd1 arranged in order from the LSB are shifted by exactly "1" toward the MSB in units of 32 bits as shown in FIG. 12B in the shift circuit $450_1$ shown in FIG. 9. The shifted color data $cwd\_a_1$ is output as color data $cwd_1$ shown in FIG. 13B from the latch circuits $453_0$ to $453_7$ shown in FIG. 9, and the color data $cwd_1$ is output to the distributer circuit 300 shown in FIG. 2 via the latch circuit $410_4$ shown in FIG. 8.

Also, the shifted color data $cwd\_a_1$ is output to the shift circuit $450_2$ via the selectors $451_0$ to $451_7$ and the latch circuits $452_0$ to $452_7$.

Next, the 256 bits of color data comprising the color data $pix_4$ and $pix_5$ of the transfer data $hwd_2$ arranged in order from the LSB are shifted by exactly "2" toward the MSB in units of 32 bits as shown in FIG. 12C in the shift circuit $450_1$ shown in FIG. 9. Then, the shifted data is stored in the latch circuits $453_0$ to $453_7$ via the selectors $451_0$ to $451_7$ shown in FIG. 9.

At this time, the color data $pix_4$ and $pix_5$ are stored in the latch circuits $453_2$ and $453_3$.

Also, after the 256 bits of color data $cwd\_a_1$ shown in FIG. 12B output to the above shift circuit $450_2$ is shifted by exactly "1" toward the LSB, the shifted data is stored in the latch circuits $452_0$ to $452_7$ via the selectors $451_0$ to $451_7$. At this time, the color data $pix_3$ is stored in the latch circuit $452_1$.

Then, due to the output from the latch circuits $453_0$, $452_1$, and $453_2$ to $453_7$, as shown in FIG. 13C, the color data $cwd_2$ including the color data $pix_3$, $pix_4$, and $pix_5$ is output to the distributer 300 shown in FIG. 2 via the latch circuit $410_4$ shown in FIG. 8.

Next, the 256 bits of color data comprised of the color data $pix_6$ and $pix_7$ of the transfer data $hwd_3$ arranged in order from the LSB are shifted by exactly "1" toward the MSB in units of 32 bits as shown in FIG. 12D in the shift circuit $450_1$ shown in FIG. 9. The shifted color data $cwd\_a_3$ is output as the color data $cwd_3$ shown in FIG. 13D from the latch circuits $453_0$ to $453_7$ as shown in FIG. 9, and the color data $cwd_3$ is output to the distributer 300 shown in FIG. 2 via the latch circuit $410_4$ shown in FIG. 8.

Next, the 256 bits of color data comprising the color data $pix_8$ of the transfer data hwd4 arranged in order from the LSB are shifted by exactly "1" toward the MSB in units of 32 bits as shown in FIG. 12E in the shift circuit $450_1$ shown in FIG. 9. The shifted color data $cwd\_a_4$ is output as the color data $cwd_4$ shown in FIG. 13E from the latch circuits $453_0$ to $453_7$ as shown in FIG. 9, and the color data cwd4 is output to the distributer 300 shown in FIG. 2 via the latch circuit $410_4$ shown in FIG. 8.

Also, in the data rearrangement unit 400, representative coordinates (btrx, btry) corresponding to the above color data $cwd_0$ to $cwd_4$ and a valid flag btrvld are generated in an address generation unit 430.

The representative coordinates (btrx, btry) and the valid flag btrvld are included in the address $ADRW_2$ and output to the distributer 300.

Here, it is assumed that the representative coordinates are $(btrx_0, btry_0)$ to $(btrx_4, btry_4)$ and the valid flag is $btrvld_0$ to $btrvld_4$.

Note that the address $ADRW_2$ in the address generation unit 430 is generated based on a control signal $S440_5$ from the controller 440 shown in FIG. 8.

Also, the valid flag btrvld is comprised of 16 bits and indicates as explained above whether to perform a re-write of the stored contents for every memory region of each pixel at the time of writing to the DRAM 147 in units of the rectangular memory region (256×2 bits) of 16 pixels by 8 pixels (X-direction)×2 pixels (Y-direction). Each bit of the valid flag btr coordinate vld corresponds to a 1-pixel memory region of the 16-pixel memory region as a unit of write operation. Each bit of the valid flag btrvld indicates a logical value "0" when masking the corresponding memory region (when not performing re-write), while indicates a logical value "1" when not masking (when performing re-write).

Here, since the color data used for one write operation is 256 bits of data for 8 pixels, when writing the color data to a memory region having an even address in the Y-direction in the memory region to be written, the upper 8 bits of the 16 bits of the valid flag btrvld are given a logical value of "0". When writing to a memory region having an odd address in the Y-direction in the memory region to be written, the lower 8 bits of the 16 bits of the valid flag btrvld are given a logical value of "0".

As shown in FIGS. 13A to 13E, valid flags $btrvld_0$ to $btrvld_4$ are generated in the address generation unit 430 with respect to the color data $cwd_0$ to $cwd_4$, respectively.

Here, for example, since the lower 8 bits in the valid flag $btrvld_0$ have the logical value of "0", the color data $cwd_0$ is written to a memory region having an odd address in the Y-direction in the memory region to be written.

Also, the address generation unit 430 generates the representative points $(btrx_0, btry_0)$ to $(btrx_4, btry_4)$ as shown in FIGS. 13A to 13E at the time of writing the color data $cwd_0$ to $cwd_4$ shown in FIGS. 12A to 12E to the DRAM 147 in units of rectangular memory regions for 16 pixels by 8 pixels (X-direction)×2 pixels (Y-direction) as explained above.

As explained above, the color data $cwd_0$ to $cwd_4$ shown in FIGS. 13A to 13E generated in the data rearrangement circuit 420 shown in FIG. 8 of the data rearrangement unit 400 shown in FIG. 2 are written to the DRAM 147 shown in FIG. 2 as will be explained below, through processing of the distributer 300, address converter 310, and memory controllers 350, 360, 370, and 380 shown in FIG. 2 based on the representative points $(btrx_0, btry_0)$ to $(btrx_4, btry_4)$ and valid flag btrvld0 to btrvld4 shown in FIGS. 13A to 13E included in the address $ADRW_2$ generated in the address generation unit 430 shown in FIG. 8 as explained above.

Figure 14A:
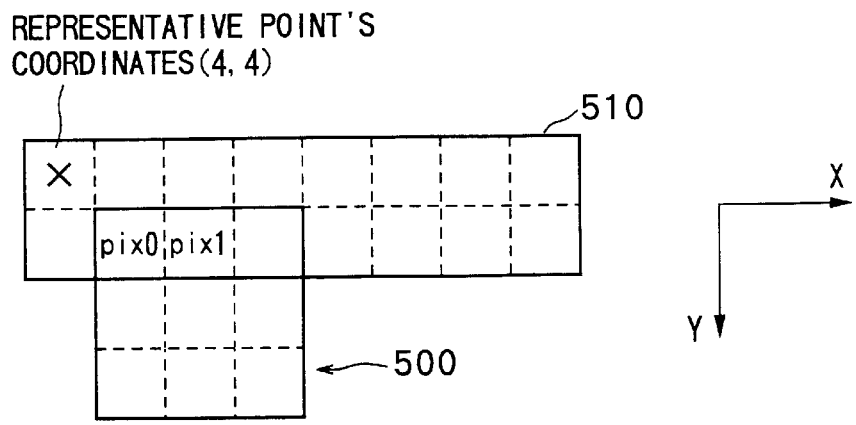
FIGS. 14A to 14C are views for explaining an operation to write the color data shown in FIGS. 13A to 13E to a DRAM shown in FIG. 1.

First, as shown in FIG. 14A, color data $cwd_0$ is written to a memory region where a Y-coordinate is "5" (an odd number) in a 16-pixel rectangular memory region 500 designated by the representative coordinates $(btrx_0, btry_0) = (4, 4)$ in order that the LSB of the color data $cwd_0$ shown in FIG. 13A be written in an address having the smallest X-coordinate in the memory region. At this time, as explained above, when all of the lower 8 bits of the valid flag $btrvld_0$ have a logical value "0", the color data $cwd_0$ is written in a memory region having an odd Y-coordinate, while when all of the upper 8 bits of the valid flag $btrvld_0$ have a logical value of "0", the color data $cwd_0$ is written in a memory region having an even Y-coordinate.

Also, the color data $cwd_0$ is written only to 32-bit memory regions respectively corresponding to bits having a logical value "1" in the valid flag $btrvld_0$. In this case, since the valid flag $btrvld_0$ is "0×0600", that is, "0000011000000000", and a bit having a logical value "1" corresponds to a memory region where the (x, y) coordinates are (5,5) and (6,5), color data pixo and pix1 are written only to the memory region as shown in FIG. 14A.

Figure 14B:
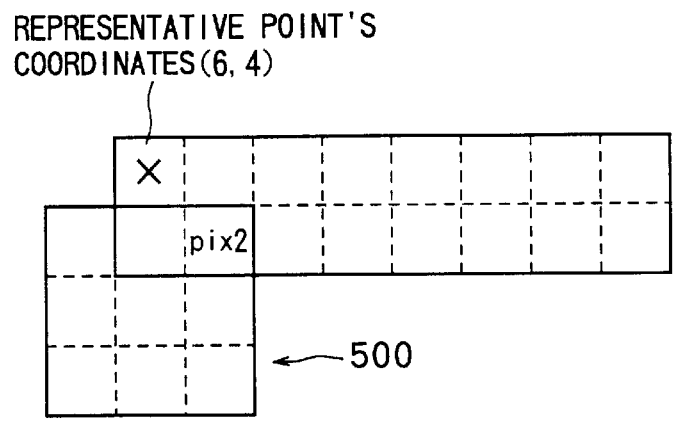

Next, as shown in FIG. 14B, color data $pix_2$ of the color data $cwd_1$ shown in FIG. 13B is written to a memory region where a Y-coordinate is "5" (an odd number) in a 16-pixel rectangular memory region 500 designated by representative coordinates $(btrx_1, btry_1)=(6, 4)$. The write method is the same as that in the above case of FIG. 14A.

Figure 14C:
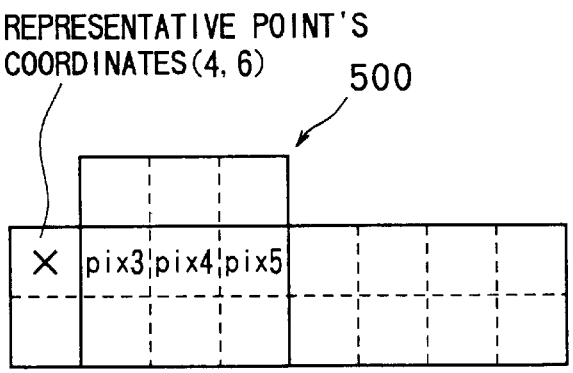
Figure 15D:
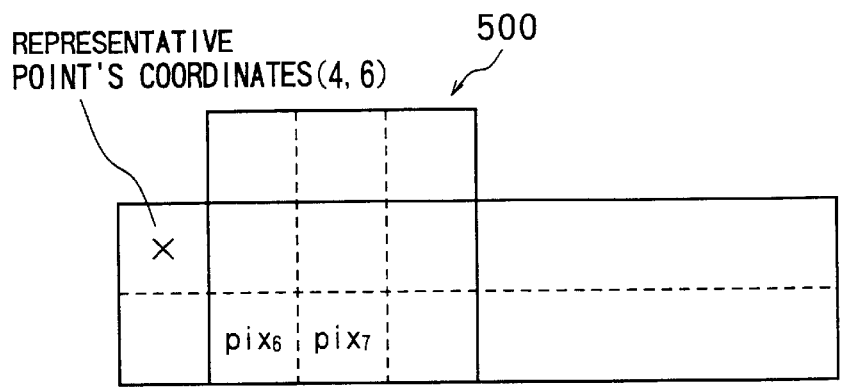
FIGS. 15D to 15E are views for explaining an operation to write the color data shown in FIGS. 13A to 13E to the DRAM shown in FIG. 1.
Figure 15E:
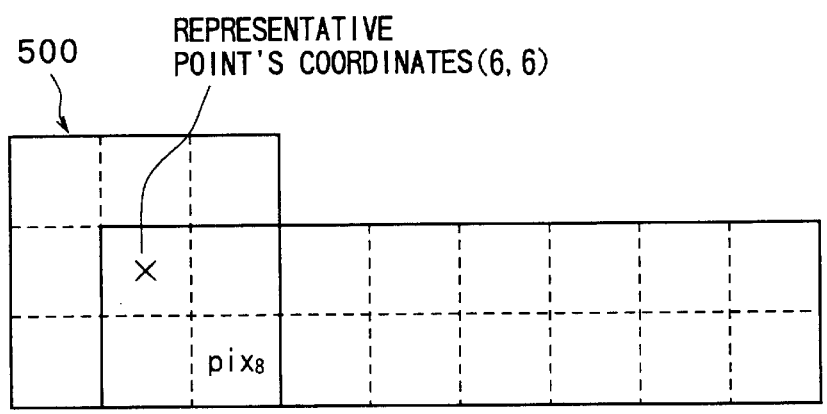

Next, in the same way, as shown in FIG. 14C, color data $pix_3$, $pix_4$, and $pix_5$ of color data $cwd_2$ shown in FIG. 13C are written to a memory region where a Y-coordinate is "6" (an even number) in a 16-pixel rectangular memory region designated by representative coordinates $(btrx_2, btrx_2)=(4, 6)$. Next, in the same way, as shown in FIG. 15D, color data $pix_6$ and $pix_7$ of color data $cwd_3$ shown in FIG. 13D are written to a memory region where a Y-coordinate is "7" (an odd number) in a 16-pixel rectangular memory. region designated by representative coordinates $(btrx_3, btry_3)=(4, 6)$.

Then, in the same way, as shown in FIG. 15F, the color data $pix_8$ of color data $cwd_4$ shown in FIG. 13E is written to a memory region where the Y-coordinate is "7" (an odd number) in the 16-pixel rectangular memory region 500 designated by the representative coordinates (btrx4, btry4)= (6,6).

As a result, the 32 bits of color data $pix_0$ to $pix_8$ for 8 pixels included in the transfer data $hwd_0$ to $hwd_4$ having a width of 64 bits shown in FIG. 11 input from the texture engine circuit 143 are written to the rectangular memory region 500 shown in FIG. 10.

Note that, in the above example of FIGS. 11 to 15, a case was explained where the color data $pix_0$ to $pix_8$ having a data length of 32 bits for one pixel was input from the texture engine circuit 143 and written to the rectangular memory region shown in FIG. 10, however, the data length of one pixel may be any length, for example, 16 bits.

Below, the processing for receiving as input the color data $pix_0$ to $pix_8$ having a data length of 16 bits for one pixel from the texture engine circuit 143 and writing the same to the rectangular memory region 500 shown in FIG. 10 will be explained.

Figure 16:
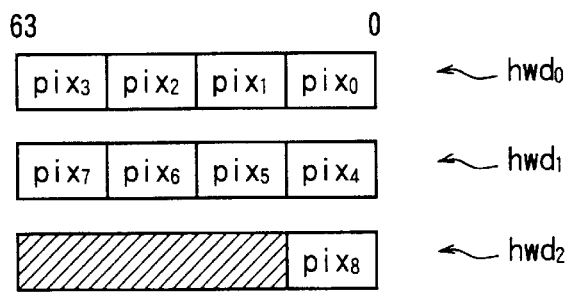
FIG. 16 is a view for explaining the operation of a "host to local" transfer mode in a case where a data length of one pixel in the data rearrangement unit shown in FIG. 2 is 16 bits.

In this case, as shown in FIG. 16, transfer data having a width of 64 bits input from the texture engine circuit 143 includes color data for 4 pixels.

Figures 17A, 17B, 17C:
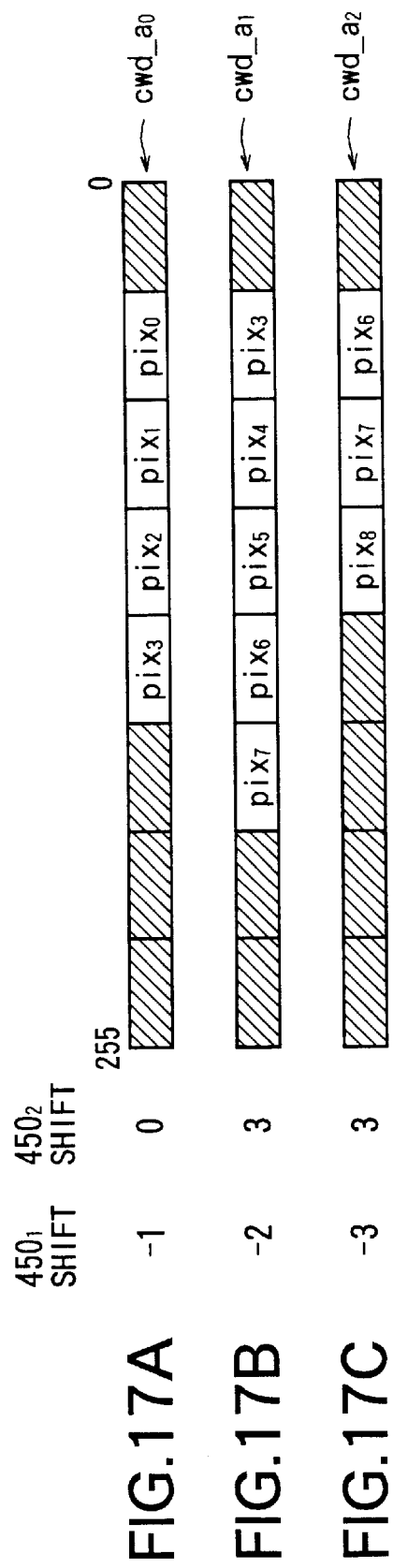
FIGS. 17A to 17C are views for explaining the operation of a "host to local" transfer mode in a case where a data length of one pixel in the data rearrangement unit shown in FIG. 2 is 16 bits.
Figures 18A, 18B, 18C:
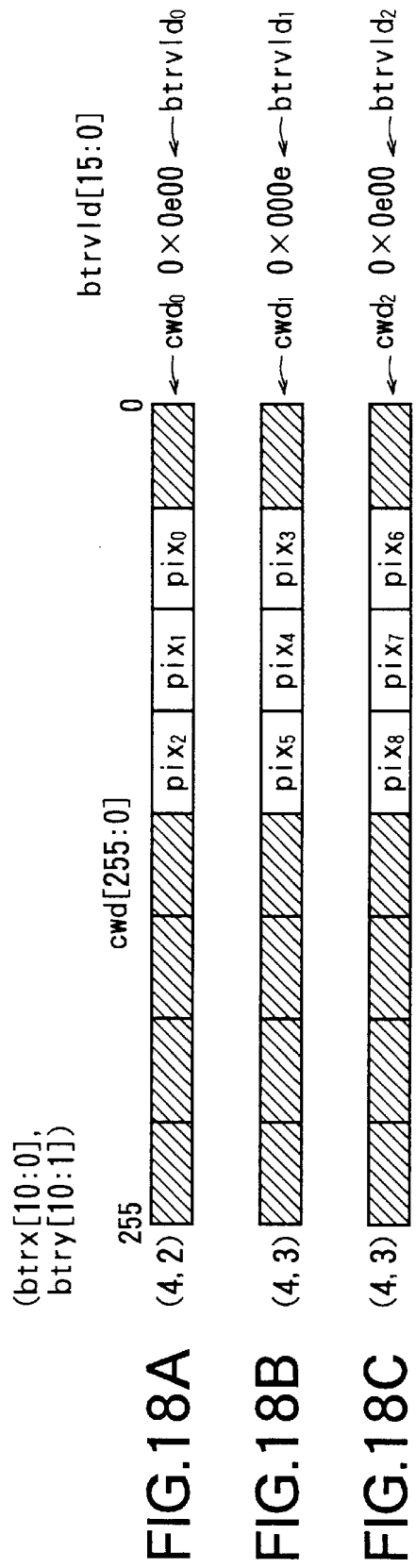
FIGS. 18A to 18C are views for explaining the operation of a "host to local" transfer mode in a case where a data length of one pixel in the data rearrangement unit shown in FIG. 2 is 16 bits.

In this case, 256 bits of color data including the color data $pix_0$ to $pix_3$ included in the transfer data $hwd_0$ shown in FIG. 16 are shifted by exactly one bit toward the MSB in a shift circuit $450_1$ of the data rearrangement circuit 420 shown in FIG. 9, 256 bits of color data $cwd\_a_0$ shown in FIG. 17A are generated, and color data $cwd_0$ shown in FIG. 18A is output in accordance with the color data $cwd\_a_0$ from the latch circuits $453_0$ to $453_7$ to the distributer 300.

Next, the 256 bits of color data including the color data $pix_4$ to $pix_7$ included in the transfer data hwd1 shown in FIG. 16 are shifted exactly by 2 bits toward the MSB in the shift circuit $450_1$ of the data rearrangement circuit 420 shown in FIG. 9, the 256 bits of color data $cwd\_a_1$ shown in FIG. 17B are generated by further adding the color data $pix_3$ included in the transfer data $hwd_0$, and the color data cwd1 shown in FIG. 18B in accordance with the color data $cwd\_a_1$ is output to the distributer 300.

Next, the 256 bits of color data including the color data $pix_8$ included in the transfer data $hwd_2$ shown in FIG. 16 are shifted by exactly 3 bits toward the MSB in the shift circuit $450_1$ of the data rearrangement circuit 420 shown in FIG. 9, the 256 bits of color data $cwd\_a_2$ shown in FIG. 17C are generated by further adding the color data $pix_6$ and $pix_7$ included in the transfer data $hwd_1$, and the color data $cwd_2$ shown in FIG. 18C in accordance with the color data $cwd\_a_2$ is output to the distributer 300.

The representative coordinates (btrx, btry) and the valid flag btrvld shown in FIGS. 18A to 18C corresponding to the color data $cwd_0$ to $cwd_3$ are generated in the address generation unit 430.

As a result, the 16 bits of color data $pix_0$ to $pix_8$ for 8 pixels included in the transfer data $hwd_0$ to $hwd_2$ having a width of 64 bits shown in FIG. 16 input from the texture engine circuit 143 are written to the rectangular memory region 500 shown in FIG. 10.

<"Local to Host" Transfer Mode>

Below, the operation of packing color data mc__0dtr to mc__7dtr for 8 pixels read from the DRAM 147 into transfer data having a width of 64 bits and outputting this to the host interface circuit 149 will be explained.

Note that, as mentioned above, the DRAM 147 is read from in units of a rectangular memory region storing color data of 8, that is, 8 pixels (X-direction)× one pixel (Y-direction) based on a representative point. As an address of the representative point in the read operation, any address can be designated in the Y-direction while only addresses of multiples of 8 can be designated in the X-direction.

In this case, the address generation unit 430 of the data rearrangement unit 400 shown in FIG. 8 calculates, based on an address $ADRR_1$ input from the host interface circuit 149, representative coordinates (sbx, sby) in the order of increasing X-coordinates in the scan line direction from the top left end of FIG. 19 in the X- and Y-coordinate system shown in FIG. 19. Then, an address $ADRR_2$ including the representative coordinates (sbx, sby) is output to the distributer 300.

Also, the data rearrangement circuit 420 receives as input the color data mc__0dtr to mc__7dtr for 8 pixels read from the DRAM 147 in accordance with the address $ADRR_2$ via an FIFO circuit $410_3$ of the data rearrangement unit 400 shown in FIG. 8 from the read controller shown in FIG. 2, performs packing to transfer data having a width of 64 bits, and outputs the same to the host interface circuit 149 via the FIFO circuit $410_1$.

At this time, the color data mo__0dtr is the color data stored at the representative point of a rectangular memory region being read, while the color data mc__7dtr is the color data stored at coordinates wherein the X-coordinate in the rectangular memory region is maximum.

Below, as an example, the operation of a case of packing the color data $pix_0$ to $pix_{38}$ read from a rectangular memory region 600 having origin coordinates of (5,5) in the DRAM 147 into transfer data having a width of 64 bits including color data for 4 pixels and outputting the same to the host interface circuit 149 will be explained.

First, the address $ADRR_1$ is input from the host interface circuit 149 to the address generation unit 430.

Then, in the address generation circuit, the address ADDRR$_2$ including representative coordinates (sbx$_0$, sby$_0$) to (sbx$_8$, sby$_8$) shown in FIG. 19 and FIGS. 20A to 20I is successively output to the distributer 300 shown in FIG. 2 and subjected to processing of address converter 310 and memory controllers 350, 360, 370 and 380. Then, the color data mc__0dtr to mc__7dtr shown in FIGS. 20A to 20I are successively output from the read controller 390 shown in FIG. 2 to the data rearrangement circuit 420 via the data rearrangement circuit 400 and the FIFO circuit 410$_3$.

In the data rearrangement circuit shown in FIG. 9, the following processing is performed based on a control signal S440$_6$ from the controller 440.

Note that the shift circuit 450$_1$ shown in FIG. 9 has an output memory region of 256 (=32×8) bits connected to input terminals of selectors 451$_0$ to 451$_7$ and an internal memory region of 224 (=32×7) bits positioned at upper bits of the output memory region and performs a shift operation in units of 32 bits.

First, the 256 bits of color data mc__0dtr to mc__7dtr shown in FIG. 20A are input to the shift circuit 450$_1$ where they are shifted by exactly "5" toward the LSB in units of 32 bits, then the color data pix$_0$ to pix$_2$ are stored in the latch circuits 453$_0$ to 453$_2$.

Next, the 256 bits of color data mc__0dtr to mc__7dtr shown in FIG. 20B are input to the shift circuit 450$_1$ where they are shifted by exactly "3" toward the MSB in units of 32 bits, then the color data pix$_3$ to pix$_7$ stored in the output memory region are written to the latch circuits 452$_3$ to 452$_7$ via the input terminals a and output terminals c.

As a result, the color data cwd$_{\_b1}$ indicated in the part corresponding to the output memory region of FIG. 21B is stored in the latch circuits 453$_0$ to 453$_7$.

Figure 22:
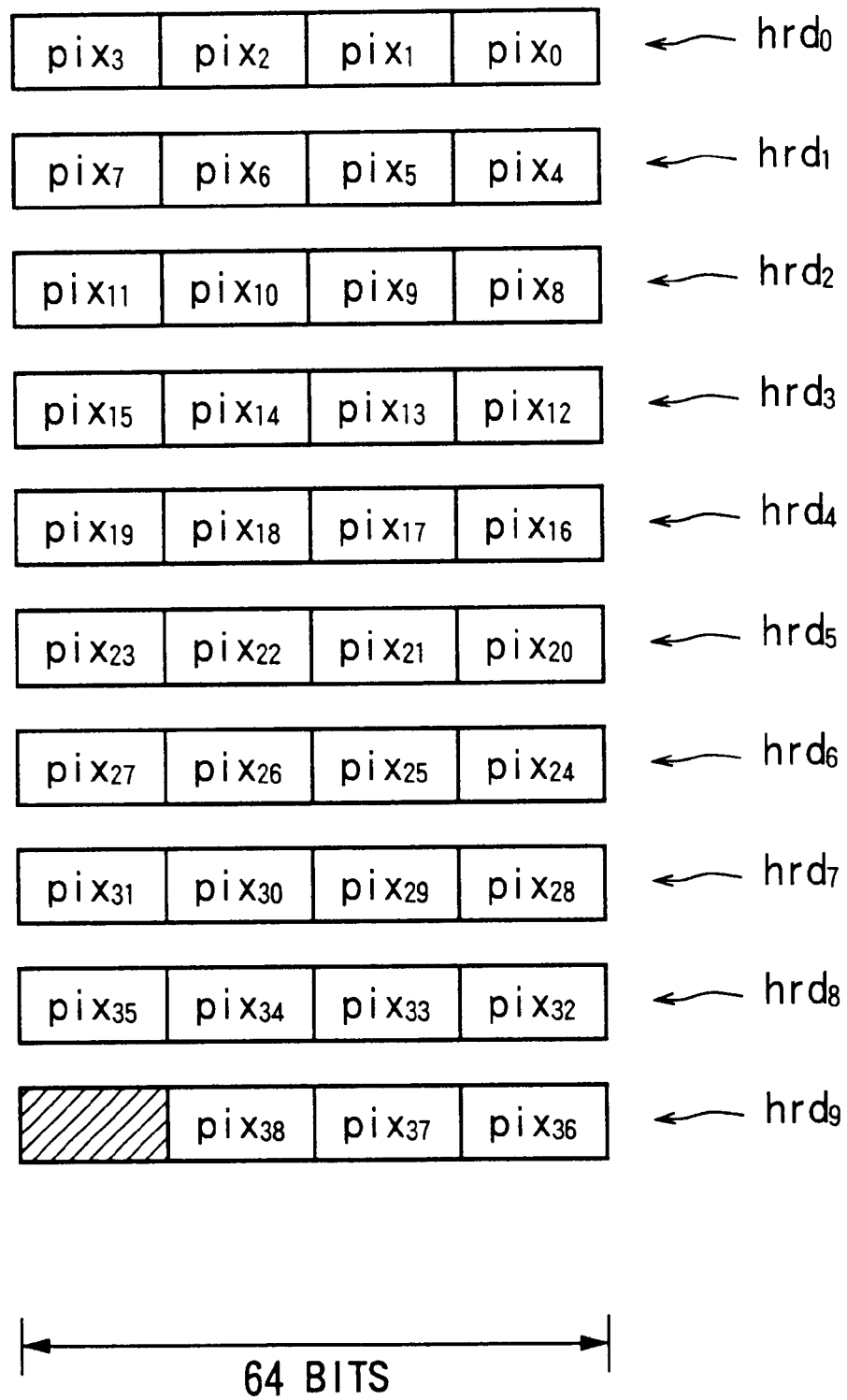
FIG. 22 is a view for explaining the operation of a "local to host" transfer mode in the data rearrangement unit shown in FIG. 2.

Then, the color data pix$_0$ to pix$_3$ stored in the latch circuits 453$_0$ to 453$_3$ are output as the 64 bits of transfer data hrd$_0$ shown in FIG. 22 to the host interface circuit 149 via the FIFO circuit 410$_2$ shown in FIG. 8.

Then, the color data pix$_4$ to pix$_7$ stored in the latch circuits 453$_4$ to 453$_7$ are output as 64 bits of transfer data hrd1 shown in FIG. 22 via the FIFO 410$_2$ shown in FIG. 8.

The color data pix$_8$ to pix$_{10}$ stored in the internal memory region of the shift circuit 450$_1$ are shifted exactly by "8" toward the LSB in units of 32 bits and written to the latch circuits 453$_0$ to 453$_2$.

Next, the color data mc__0dtr to mc__7dtr shown in FIG. 20C are input to the shift circuit 450$_1$, where they are shifted exactly by "3" toward the MSB, then are output and written to the latch circuits 453$_3$ and 453$_4$.

Then, the color data mc__0dtr to mc__7dtr shown in FIG. 20C are input to the shift circuit 450$_1$ where they are shifted exactly by "3" toward the MSB, then output, and the color data pix$_{11}$ and pix$_{12}$ are written to the latch circuits 453$_3$ and 453$_4$.

Then, the color data mc__0dtr to mc__7dtr shown in FIG. 20D are input to the shift circuit 450$_1$ and output without being shifted, and the color data pix$_{11}$ and pix$_{12}$ are written to the latch circuits 453$_5$ and 453$_7$.

As a result, the color data cwd__b$_3$ indicated by a portion corresponding to the output memory region shown in FIG. 21D is stored in the latch circuits 453$_0$ to 453$_7$.

Then, the color data pix$_8$ to pix$_{11}$ stored in the latch circuits 453$_0$ to 453$_3$ are output as 64 bits of transfer data hrd$_2$ shown in FIG. 22 to the host interface circuit 149 via the FIFO circuit 410$_2$ shown in FIG. 8.

Also, the color data mc__0dtr to mc__7dtr shown in FIG. 20E are input to the shift circuit 450$_1$ and output without being shifted, and the color data pix$_{16}$ and pix$_{23}$ are written to the latch circuits 453$_0$ and 453$_7$.

As a result, the color data cwd$_4$ indicated by the portion corresponding to the output memory region of FIG. 21E is stored in the latch circuits 453$_0$ to 453$_7$.

Then, the color data pix$_{16}$ to pix$_{19}$ stored in the latch circuits 453$_0$ to 453$_3$ are output as 64 bits of transfer data hrd4 shown in FIG. 22 to the host interface circuit 149 via the FIFO circuit 410$_2$ shown in FIG. 8.

Next, the color data pix$_{20}$ to pix$_{23}$ stored in the latch circuits 453$_4$ to 453$_7$ are output as transfer data hrd$_5$ shown in FIG. 22 to the host interface 149 via the FIFO circuit 410$_2$ shown in FIG. 8.

Also, the 256 bits of color data mc__0dtr to mc__7dtr shown in FIG. 20F are input to the shift circuit 450$_1$ and output without being shifted, and color data pix$_{24}$ and pix$_{25}$ are written to the latch circuits 453$_0$ and 453$_1$.

Next, the 256 bits of color data mc__0dtr to mc__7dtr shown in FIG. 20G are input to the shift circuit 450$_1$ where they are shifted by exactly "3" toward the LSB in units of 32 bits, and color data pix$_{26}$ to pix$_{28}$ are written to the latch circuits 453$_2$ to 453$_4$.

Next, the 256 bits of color data mc__0dtr to mc__7dtr shown in FIG. 20H are input to the shift circuit 450$_1$ where they are shifted by exactly "5" toward the MSB in units of 32 bits, and color data pix$_{29}$ to pix$_{31}$ among the color data pix$_{29}$ to pix$_{36}$ stored in the output memory region are written to the latch circuits 453$_5$ to 453$_7$.

As a result, color data cwd__b$_7$ indicated by the portion corresponding to the output memory region of FIG. 21H is stored in the latch circuits 453$_0$ to 453$_7$.

Then, the color data pix$_{24}$ to pix$_{27}$ stored in the latch circuits 453$_0$ to 453$_3$ are output as 64 bits of transfer data hrd6 shown in FIG. 22 to the host interface circuits 149 via the FIFO circuits 410$_2$ shown in FIG. 8.

Then, the color data pix$_{28}$ to pix$_{31}$ stored in the latch circuits 453$_4$ to 453$_7$ are output as 64 bits of transfer data hrd7 shown in FIG. 22 to the host interface circuits 149 via the FIFO circuits 410$_2$ shown in FIG. 8.

Then, the color data pix$_{32}$ to pix$_{36}$ stored in the internal memory region of the shift circuit 450$_1$ are shifted by exactly "8" toward the LSB in units of 32 bits and written to the latch circuits 453$_0$ to 453$_4$.

Then, the color data mc__0dtr to mc__7dtr shown in FIG. 20I are input to the shift circuit 450$_1$ where they are output after being shifted by exactly "5" toward the MSB in units of 32 bits, and color data pix$_{37}$ and pix$_{38}$ are written to the latch circuits 453$_5$ and 453$_6$.

As a result, the color data cwd__b$_8$ shown in FIG. 21I is stored in the latch circuits 453$_0$ to 453$_6$.

Then, the color data pix$_{32}$ to pix$_{35}$ stored in the latch circuits 453$_0$ to 453$_3$ are output as 64 bits of transfer data hrd8 shown in FIG. 22 to the host interface circuits 149 via the FIFO circuits 410$_2$ shown in FIG. 8.

Then, the color data pix$_{36}$ to pix$_{38}$ stored in the latch circuits 453$_4$ to 453$_6$ are output as 64 bits of transfer data hrd8 shown in FIG. 22 to the host interface circuits 149 via the FIFO circuits 410$_2$ shown in FIG. 8.

As explained above, the color data pix$_0$ to pix$_{38}$ read from the rectangular memory region 600 inside the DRAM 147 having a width of 13, height of 3 and the origin coordinates of (5,5) shown in FIG. 19 are packed into the transfer data hrd$_0$ to hrd$_9$ having a width of 64 bits including color data for 4 pixels as shown in FIG. 22 and output to the host interface circuit 149.

<"Local to Local" Transfer Mode>

In this case, the color data mc_0dtr to mc_7dtr for 8 pixels read from a memory region of a transfer destination inside the DRAM 147 based on the representative coordinates (sbx, sby) is written to a memory region to be written (transfer destination) based on the representative point coordinates (btrx, btry).

At this time, the order of calculating the representative point coordinates of the rectangular memory region of the transferring origin is not in one direction as in the above "host to local" transfer mode, but in a specified direction.

Below, the operation of writing the color data $pix_0$ to $pix_{38}$ read from the rectangular memory region 600 shown in FIG. 19 in the DRAM 147 in a rectangular memory region having a width of 13, a height of 3, and origin coordinates of (10,7) by generating representative point coordinates (sbx, sby) in the order from the right to the left and from the bottom to the top and generating the representative point coordinates (btrx, btry) in the order from the right to the left and from the bottom to the top will be explained.

First, in the address generation unit 430 shown in FIG. 8, in order to perform the read operation of the rectangular memory region 600 shown in FIG. 19, the address $ADRR_2$ including representative point coordinates ($sbx_8$, $sby_8$) to ($sbx_0$, $sby_0$) shown in FIG. 23A to 23I is successively output to the distributer 300 shown in FIG. 2 and subjected to the processing of the address converter 310 and memory controllers 350, 360, 370, and 380, then color data mc_0dtr to mc_7dtr shown in FIG. 23A to 23I are successively output from the read controller 390 shown in FIG. 2 to the FIFO circuit $410_3$ of the data rearrangement circuit 420 via the data rearrangement unit 400 shown in FIG. 8.

Namely, the representative point coordinates are output to the distributer 300 in an inverse order compared with the above case shown in FIG. 20.

Next, the following processing will be performed in the data rearrangement circuit 420 shown in FIG. 9 based on the control signal $S440_6$ from the controller 440.

Figure 23:
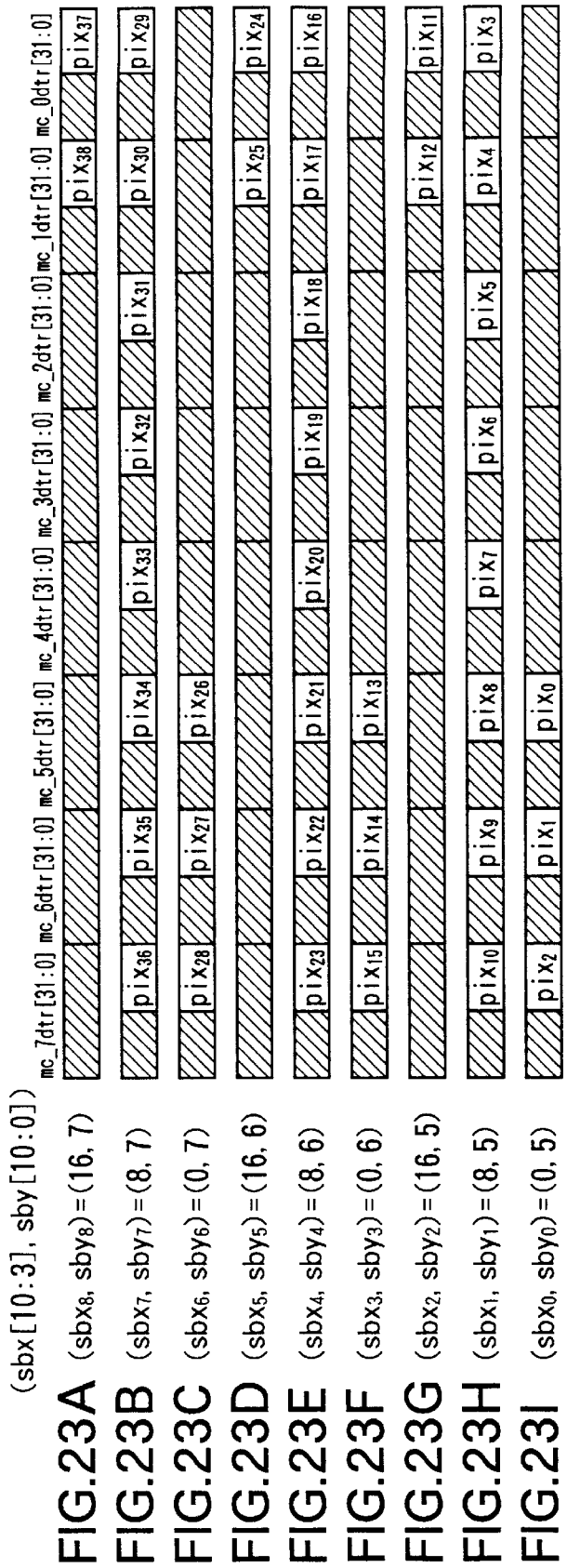
FIGS. 23A to 23I are views for explaining the operation of a "local to host" transfer mode in the data rearrangement unit shown in FIG. 2.
Figure 24:
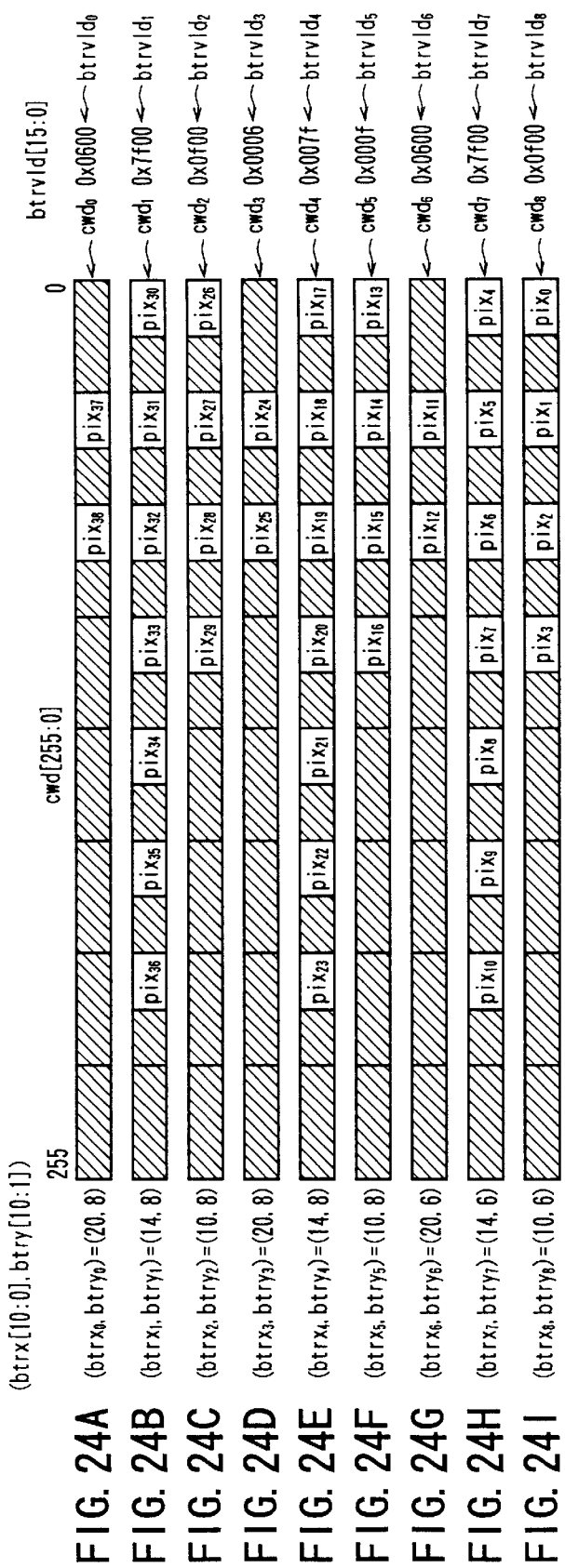
FIGS. 24A to 24I are views for explaining the operation of a "local to host" transfer mode in the data rearrangement unit shown in FIG. 2.

First, the color data mc_0dtr to mc_7dtr shown in FIG. 23A are shifted by exactly "1" toward the MSB in units of 32 bits in the shift circuit $450_1$ shown in FIG. 9, the shifted color data is output as color data $cwd_0$ shown in FIG. 24A from the latch circuits $453_0$ to $453_7$ shown in FIG. 9, and the color data $cwd_0$ is output to the distributer 300 shown in FIG. 2 via the latch circuit $410_4$ shown in FIG. 8.

Next, the color data mc_0dtr to mc_7dtr shown in FIG. 23B are written to the latch circuits $453_0$ to $453_7$ without being shifted and output to the shift circuit $450_1$ where the data is shifted by exactly "1" toward the LSB in units of 32 bits, and the shifted color data is written to the latch circuits $452_0$ to $452_7$ via the selectors $451_0$ to $451_7$.

Then, the color data $cwd_1$ shown in FIG. 24A is output from the latch circuits $452_0$ to $452_7$ to the distributer 300 via the latch circuit $410_4$ shown in FIG. 8.

Then, the color data stored in the latch circuits $453_0$ to $453_7$ is further output to the shift circuit $450_2$ and shifted by exactly "3" toward the MSB in units of 32 bits therein. Then the shifted color data is written to the latch circuits $452_0$ to $452_7$ via the selectors $451_0$ to $451_7$. As a result, the color data $pix_{29}$ is stored in the latch circuit $452_3$.

Also, the color data mc_0dtr to mc_7dtr shown in FIG. 23C are shifted by exactly "5" toward the LSB in the shift circuit shown in FIG. 9 and written to the latch circuits $453_0$ to $453_7$. As a result, the color data $pix_{26}$ to $pix_{28}$ are stored in the latch circuits $453_0$ to $453_2$.

Then, the color data $cwd_2$ shown in FIG. 24C is output from the latch circuits $452_3$ and $453_0$ to $453_2$ to the distributer 300 via the latch circuit $410_4$ shown in FIG. 8.

Next, the color data mc_0dtr to mc_7dtr shown in FIG. 23D are shifted by exactly "1" toward the MSB in units of 32 bits in the shift circuit $450_1$ shown in FIG. 9. The shifted color data is output as color data $cwd_3$ shown in FIG. 24D from the latch circuits $453_0$ to $453_7$ shown in FIG. 9, and the color data $cwd_3$ is output to the distributer 300 via the latch circuit $410_4$ shown in FIG. 8.

Next, the color data mc_0dtr to mc_7dtr shown in FIG. 23E are written to the latch circuits $453_0$ to $453_7$ without being shifted in the shift circuit $450_1$ shown in FIG. 9 and output to the shift circuit $450_2$ and shifted by exactly "1" toward the LSB in units of 32 bits therein. The shifted color data is written to the latch circuits $452_0$ to $452_7$ via the selectors $451_0$ to $451_7$.

Then the color data cwd4 shown in FIG. 24E is output from the latch circuits $452_0$ to $452_7$ to the distributer 300 via the latch circuit $410_4$ shown in FIG. 8.

Next, the color data shown in FIG. 23E stored in the latch circuits $453_0$ to $453_7$ is further output to the shift circuit $450_2$ and shifted by exactly "3" toward the MSB in units of 32 bits therein. The shifted color data is written to the latch circuits $452_0$ to $452_7$ via the selectors $451_0$ to $451_7$. As a result, the color data $pix_{16}$ is stored in the latch circuit $452_3$.

Also, the color data mc_0dtr to mc_7dtr shown in FIG. 23F are shifted by exactly "5" toward the LSB in the shift circuit $450_1$ shown in FIG. 9 and written to the latch circuits $453_0$ to $453_7$. As a result, the color data $pix_{13}$ to $pix_{15}$ are stored in the latch circuits $453_0$ to $453_2$.

Then, the color data $cwd_5$ shown in FIG. 24F is output from the latch circuits 453 and $453_0$ to $453_2$ to the distributer circuit 300 via the latch circuit $410_4$ shown in FIG. 8.

Next, the color data mc_0dtr to mc_7dtr shown in FIG. 23G are shifted by exactly "1" toward the MSB in units of 32 bits in the shift circuit $450_1$ shown in FIG. 9. The shifted color data is output as color data $cwd_6$ shown in FIG. 24G from the latch circuit $453_0$ to $453_7$ shown in FIG. 9, and color data $cwd_6$ is output to the distributer 300 via the latch circuit $410_4$ shown in FIG. 8.

Next, the color data mc_0dtr to mc_7dtr shown in FIG. 23H are written to the latch circuit $453_0$ to $453_7$ without being shifted in the shift circuit $450_1$ shown in FIG. 9 and output to the shift circuit $450_2$ and shifted by exactly "1" toward the LSB in units of 32 bits therein. The shifted color data is written to the latch circuits $452_0$ to $452_7$ via the selectors $451_0$ to $451_7$.

Then, the color data $cwd_7$ shown in FIG. 24H is output from the latch circuits $452_0$ to $452_7$ to the distributer 300 via the latch circuit $410_4$.

Next, the color data shown in FIG. 24H stored in the latch circuits $453_0$ to $453_7$ is further output to the shift circuit $450_2$ to be shifted by exactly "3" toward the MSB in units of 32 bits. The shifted color data is written to the latch circuits $452_0$ to $452_7$ via the selectors $451_0$ to $451_7$. As a result, color data $pix_3$ is stored in the latch circuit $452_3$.

Also, the color data mc_0dtr to mc_7dtr shown in FIG. 23I are shifted by exactly "5" toward the LSB in the shift circuit shown in FIG. 9 and written to the latch circuits $453_0$ to $453_7$. As a result, the color data $pix_0$ to $pix_3$ are stored in the latch circuits $453_0$ to $453_2$.

Then color data $cwd_8$ shown in FIG. 24I is output from the latch circuits $452_3$ and $453_0$ to $453_0$ to the distributer 300 via the latch circuit $410_4$.

Also, in the data rearrangement unit 400, as shown in FIGS. 24A to 24I, representative point coordinates ($btrx_0$, $btry_0$) to ($btrx_8$, $btry_8$) and valid flags $btrvld_0$ to $btrvld_8$ corresponding to the above color data $cwd_0$ to $cwd_8$ are generated in the address generation unit 430. The representative point coordinates ($btrx_0$, $btry_0$) to ($btrx_8$, $btry_8$) and valid flags $btrvld_0$ to $btrvld_8$ are included in an address $ADRW_2$ and output to the distributer 300.

Then based on the representative point coordinates ($btrx_0$, $btry_0$) to ($btrx_8$, $btry_8$) and valid flags $btrvld_0$ to $btrvld_8$, the color data $pix_0$ to $pix_{38}$ included in the color data $cwd_0$ to $cwd_8$ shown in FIGS. 24A to 24I are written in a rectangular memory region 700 in the DRAM 147 in units of 16 pixels by 8 pixels (X-direction) ×2 pixels (Y-direction).

Figure 25:
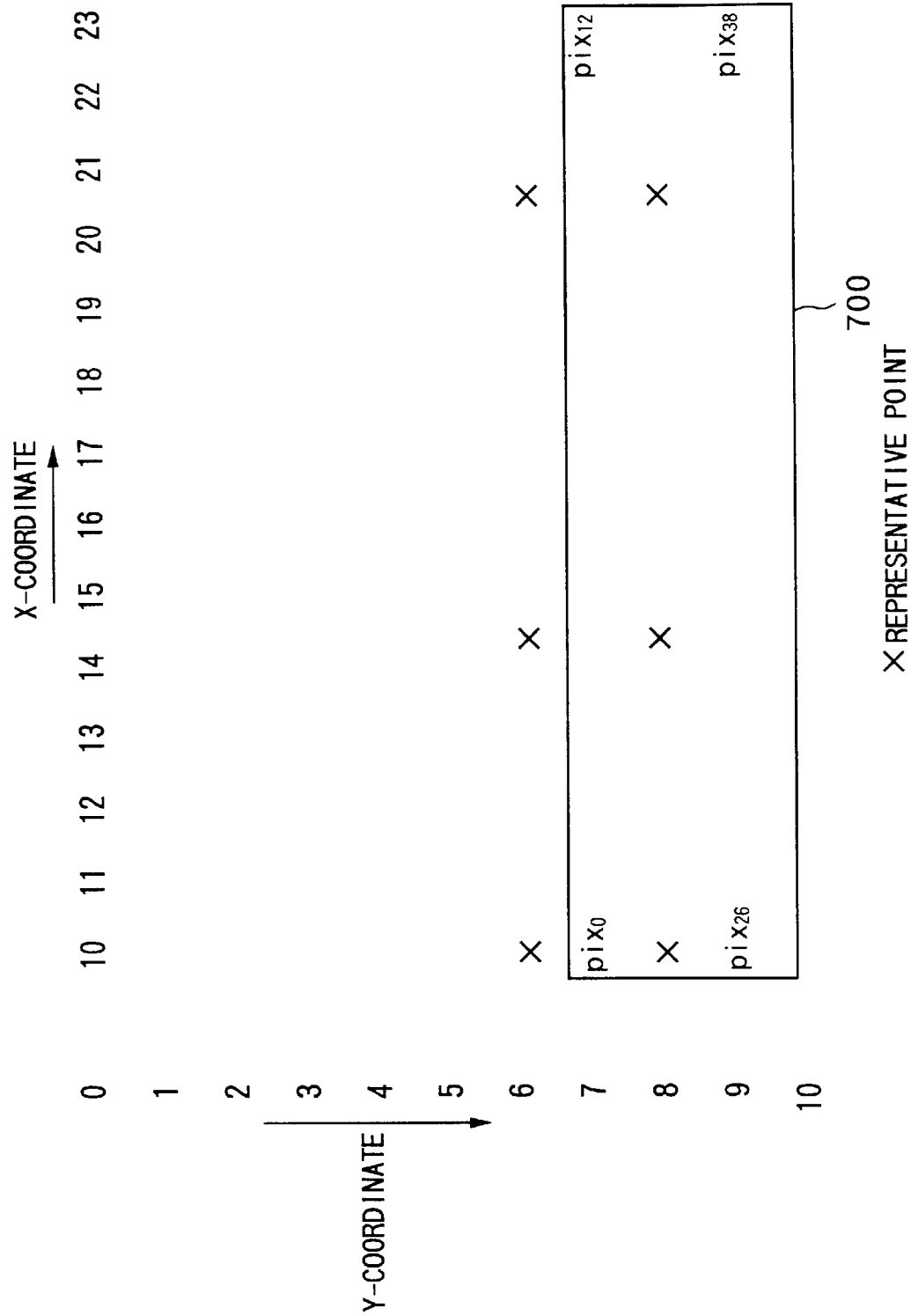
FIG. 25 is a view for explaining the operation of a "local to host" transfer mode in the data rearrangement unit shown in FIG. 2.

As a result, the color data $pix_0$ to $pix_{38}$ read from the rectangular memory region 600 shown in FIG. 19 in the DRAM 147 are transferred to the rectangular memory region 700 shown in FIG. 25.

The above is the explanation of the data arrangement circuit 420 and the address generation circuit shown in FIG. 8.

The controller 440 generates the control signals $S440_1$ to $S440_6$ based on a transfer mode indication signal S800 and a pixel data length indication signal S801 input from the texture engine circuit 143.

The controller 440 outputs the control signals $S440_1$ to $S440_4$ for controlling the FIFO circuits $410_1$ to $410_3$ and the latch circuit $410_4$.

Also the controller 440 outputs the control signal $S440_6$ for controlling the address generation unit 430.

Also, the controller 440 outputs the control signal S4406 for controlling the data rearrangement circuit 420.

Furthermore, the controller 440 controls input to the FIFO circuit $410_3$, that is, reading of the color data mc__0dtr to mc__7dtr from the DRAM 147, as will be explained below.

The controller 440 monitors the memory region of the FIFO circuit $410_3$ and when detecting that eight stages of the memory circuit, that is, half of the 16 stages of the memory circuit, each having a width of 64 bits, become empty (state that valid data is yet to be stored), outputs the control signal $S440_5$ for instructing to continuously perform reading for a number of times in accordance with the pixel data length indication signal S801 to the address generation unit 430.

Here, 256 bits of color data mc__0dtr to mc__7dtr for 8 pixels are read from the DRAM 147 by one read operation.

Specifically, the controller 440 outputs the control signal $S440_5$ indicating the read instruction number shown in FIG. 26 to the address generation unit 430 in accordance with the pixel data length indicated by the pixel data length indication signal S801.

Namely, the controller 440 outputs the control signal $S440_5$ indicating the read instruction numbers of 2, 4, 8, and 16 to the address generation units 430 when the data length of one pixel is 32 bits, 16 bits, 8 bits, and 4 bits, respectively.

By outputting the control signal $S440_5$ indicating the read instruction number shown in FIG. 26, it is possible to store the color data mc__0dtrto mc__7dtr read from the DRAM 147 in the empty (not yet storing) stages of the eight-stage memory circuit of the FIFO circuit $410_3$. At this time, the eight-stage memory circuit of the FIFO circuit $410_3$ stores 8×64 bits of color data.

Namely, in the case where the pixel data length is 32 bits, since 32×8 bits of color data are included as shown in FIG. 27A in the color data mc__0dtr to mc__7dtr read by one read operation, 32×8×2 (=8×64) bits can be read by continuously reading the color data two times.

Also, when the pixel data length is 16 bits, 16×8 bits of color data are included as shown in FIG. 27B in the color data mc__0dtr to mc__7dtr read by one read operation, so it is possible to read 16×8×4 (=8×64) bits by continuously reading the color data four times.

Also, when the pixel data length is 8 bits, 8×8 bits of color data are included as shown in FIG. 27C in the color data mc__0dtr to mc__7dtr read by one read operation, so it is possible to read 8×8×8 (=8×64) bits by continuously reading the color data eight times.

Also, when the pixel data length is 4 bits, 4×8 bits of color data are included as shown in FIG. 27D in the color data mc__0dtr to mc__7dtr read by one read operation, so it is possible to read 4×8×16 (=8×64) by successively reading the color data 16 times.

As explained above, the controller 440 monitors the memory region of the FIFO circuit $410_3$ and when eight stages of the memory circuit, that is, half of the 16 stages of the memory circuit each having a width of 64 bits, become empty, successively reads from the DRAM 147 for the number of times in accordance with the pixel data length indication signal S801 so can simplify control of the FIFO circuit $410_3$ by the controller 440 and can lighten the load on the controller. Therefore, it is possible to prevent other processing performed by the controller 440 from having to wait for control by the FIFO circuit $410_3$.

Namely, in a general FIFO of the related art wherein the above control by the controller 440 is not performed, for example, a read operation from a memory is continuously carried out as long as there is a memory circuit in an empty (yet to store) state and input control for stopping the read operation is performed when all of the stages of the memory circuit store data. However, when performing control in this way, a state occurs wherein only part of the 8 pixels of data read by one read operation is written to the FIFO circuit when reading stops. Therefore, it is necessary to read the same 8 pixels of color data as the previous time, specify the color data of a pixel not written to the FIFO circuit the previous time among the read 8 pixels of color data, and write to the FIFO circuit only the specified color data, so the control becomes complicated.

CRT Control Circuit 145

A CRT control circuit 145 generates an address for display on a not shown CRT in synchronization with the given horizontal and vertical synchronization signals and outputs a request for reading the display data from the display buffer 147*b* to the memory I/F circuit 144. In response to this request, the memory I/F circuit 144 reads a certain amount of the display data from the display buffer 147*b*. The CRT controller 145 has a built-in FIFO circuit for storing the display data read from the display buffer 147*b* and outputs the index value of RGB to the RAMDAC circuit 146 at certain time intervals.

RAMDAC Circuit 146

The RAMDAC circuit 146 stores the R, G, B data corresponding to the respective index values, transfers the R, G, B data in a digital form corresponding to the index value of RGB input from the CRT controller 145 to a not shown D/A (digital/analog) converter, and generates R, G, B data in an analog form. The RAMDAC circuit 146 outputs the generated R, G. B data to the CRT.

The entire operation of the above three-dimensional computer graphics system 10 will be explained below.

In the three-dimensional computer graphics system 10, data for drawing graphics etc. is given from a main memory 12 of a main processor 11 or an I/O interface circuit 13 for receiving graphic data from outside to a rendering circuit 14 via a main bus 15.

Note that the data for graphics etc. is subjected to coordinate conversion, clipping, lighting, and other geometric processing in accordance with need in the main processor etc.

The graphic data after the geometric processing becomes polygon rendering data S11 composed of three-dimensional coordinates of each of vertexes of a triangle, luminance values R, G, and B, and texture coordinates s, t, and q corresponding to the pixels to be drawn.

The polygon rendering data S11 is input to the DDA set-up circuit 141 of the rendering circuit 14.

In the DDA set-up circuit 141, variation data S141 indicating a difference of a side of the triangle from a horizontal direction etc. is generated based on the polygon rendering data S11. Specifically, a variation, that is, the amount of change of the values to be obtained in the case of movement by a unit length, is calculated by using the starting point, the end point, and the distance between the two, and output to the triangle DDA circuit 142 as variation data S141.

In the triangle circuit 142, the variation data S141 is used for calculation of the linearly interpolated data (z, R, G. B, s, t, q) of each of the pixels inside the triangle.

Then, the calculated (z, R, G, B, s, t, q) data and the (x, y) data of each of the vertexes of the triangle are output from the triangle DDA circuit 142 to the texture engine circuit 143 as DDA data S142.

In the texture engine circuit 143, the operation for dividing the data s by the data q and the operation for dividing the data t by data __are performed for the (s, t, q) data indicated by the DDA data S142. Then, the texture sizes USIZE and VSIZE are respectively multiplied with the division results "s/q" and "t/q" to generate the texture coordinate data (u, v).

Next, a read request S143 including the address ADRR1 is output from the texture engine circuit 143 to the memory I/F circuit 144. Then, the (R, G. B) data S148 stored in the DRAM 147 (SRAM 148) is read via the memory I/F circuit 144.

Next, in the texture engine circuit 143, the (R, G. B) data in the read (R, G, B) data S148 and the (R, G, B) data included in the DDA data S142 from the triangle DDA circuit 142 in the former stage are combined to generate the color data S143.

This color data S143 is output from the texture engine circuit 143 to the memory I/F circuit 144.

In the case of a full color mode, the (R, G, B) data read from the texture buffer 147a can be directly used, while in the case of an index color mode, data in a color index table prepared in advance is transferred from the texture color look-up table (CLUT) buffer 147d to a buffer for temporary storage. The actual R, G, B colors can be obtained from the color index by using the CLUT of the buffer for temporary storage.

Note that when the CLUT is configured by an SRAM, when a color index is input to an address of the SRAM, the actual R, G, B colors are output.

In the memory I/F circuit 144, the z-data corresponding to the color data S143 input from the texture engine circuit 143 and the z-data stored in the z-buffer 147c are compared for judging whether the image drawn by the input color data S143 is positioned closer to the viewing point than the image written in the display buffer 147b the previous time.

When it is judged that the image drawn by the input pixel data S143 is positioned closer, the z-data stored in the buffer 147c is replaced by the z-data corresponding to the image data S143.

Next, in the memory I/F circuit 144, the (R, G, B) data is written in the display buffer 147b.

The data to be written (including updated) is supplied to the memory controllers 350, 360, 370, and 380 via the data rearrangement unit 400 shown in FIG. 2, the distributer 300, the address decoders 310, 320, 330, and 340, which are write system circuits, and written to predetermined memories in parallel by the memory controllers 350, 360, 370, and 380 via the wiring groups of the write system 401W, 402W, 411W, 412W, 421W, 422W, 431W, and 432W.

In the memory I/F circuit 144, the memory block storing the texture corresponding to the texture address of the pixel to be drawn is calculated from the texture address, a read request is made only to the memory block, and the texture data is read.

In this case, since there is no access for reading texture in memory blocks which do not store the corresponding texture, it is possible to provide more time for access for drawing.

At this time, the write processing of the image data S143 from the texture engine circuit 143 to the DRAM 147 is performed by converting the transfer data hwd having a width of 64 bits into the color data cwd having a width of 256 bits, for example, as explained above with reference to FIGS. 11 to 18.

Also, in the same way for drawing, a memory block storing color data corresponding to a pixel address to be drawn is accessed to read the color data from the corresponding address for modify writing, the data is modified, then is written back to the same address.

When performing hidden plane processing, again in the same way, a memory block storing depth data corresponding to a pixel address to be drawn is accessed to read the depth data from the corresponding address for modify writing, the data is modified if necessary, then is written back to the same address.

In such transfer of data with the DRAM 147 based on the memory I/F circuit 144, the drawing performance can be improved by performing the processing up to here in parallel.

Especially, a plurality of pixels can be simultaneously calculated by the means of partially increasing the operating frequency by providing the triangle DDA circuit 142 and the texture engine 143 portions in the same circuit in a parallel execution mode (spatial parallel) or by inserting a lot of pipelines (time parallel).

Also, the color data is arranged so that the adjacent portions in the display region are in different DRAM modules under the control of the memory I/F circuit 144.

Due to this, the processing is simultaneously carried out on a plane when drawing a plane such as a triangle. Therefore, the probability of operation of the respective DRAM modules is quite high.

When displaying an image on a not illustrated CRT, in the CRT control circuit 145, the display address is generated in synchronization with the given horizontal and vertical synchronization frequencies and a request for transferring the display data is sent to the memory I/F circuit 144.

In the memory I/F circuit 144, in accordance with the request, a certain amount of the display data is transferred to the CRT control circuit 145.

In the CRT control circuit 145, the display data is stored in a not illustrated display use FIFO etc. and index values of RGB are transferred to the RAMDAC 146 at certain intervals.

Note that when a request is made by the main processor 11 to the memory I/F circuit 144 for reading data stored in the DRAM 147 or in the SRAM 148 as explained above, the read address ADRR2 is input to the address converter 391 of the read controller 390.

At this time, in the address converter 391, whether or not the address signals S350, S360, S370, and S380 from the memory controllers 350, 360, 370, and 380 are input as active is checked. When all of the address signals S350, S360, S370, and S380 are input as active, the read addresses and read request signal S391 are output to the respective memory controllers 350, 360, 370, and 380 in order to read data in units of 8 pixels or 16 pixels in response to the address signals S350, S360, S370, and S380.

Receiving the read addresses and the read request signal S391, the texture data, the (R, G, B) data, the z-data, and the texture color look-up table data are read in units of 8 pixels or 16 pixels in parallel via the wiring groups 401R, 402R, 411R, 412R, 421R, 422R, 431R, and 432R of the read system in the memory controllers 350, 360, 370, and 380, then input to the data processing unit 392 via the wiring groups 351, 361, 371, and 381 of the read system and the wiring group 440.

Then, predetermined processing is carried out in the data processing unit 392 and the result is converted from the color data mc_0dtr to mc_7dtr having a width of 267 bits to transfer data hrd having a width of 64 bits in the data rearrangement unit 400 and output to the requested destination, such as the main processor 11 via the host interface circuit 149.

In the RAMDAC 146, RGB values with respect to RGB indexes are stored inside the RAM and the RGB values with respect to the index values are transferred to a not illustrated D/A converter.

Then, the RGB signal converted into an analog signal by the D/A converter is transferred to the CRT.

As explained above, according to the present embodiment, even when the data format is different between the host interface circuit 149 and texture engine circuit shown in FIG. 1 and the DRAM 147, the data transfer between the texture engine circuit 143 and host interface circuit 149 and the DRAM 147 can be correctly carried out by rearranging the data in the data rearrangement unit 400.

Also, according to the present embodiment, even when address patterns for accessing the DRAM 147 is limited, reading and writing of color data to the DRAM 147 can be correctly carried out by rearranging the data in consideration of the limit in the data rearrangement unit 400.

Also, according to the present embodiment, in the data rearrangement unit 400 shown in FIG. 8, the controller 440 monitors the memory region of the FIFO circuit 410₃ and when eight stages of the memory circuit, that is, half of the 16 stages of the memory circuit, each having a width of 64 bits, becomes empty, successively reads from the DRAM 147 for the number of times exactly in accordance with the pixel data length indication signal S801 so as to simplify control of the FIFO circuit 410₃ by the controller 440 and lighten the load on the controller 440. Therefore, it is possible to prevent other processing performed by the controller 440 from waiting for the control by the FIFO circuit 410₃.

Furthermore, according to the present embodiment, in the memory I/F circuit 144 for accessing (writing or reading) the DRAM 147 or SRAM 148, the write path and the read path are separately configured. When writing, the write address ADRW and color data cwd are processed in the data rearrangement unit 400, distributer 300, address converters 310, 320, 330, and 340 and memory controllers 350, 360, 370, and 380 as the write system circuits and written to the DRAM 147, while when reading, the processing is performed in the data rearrangement unit 400, read controller 390, and main controllers 350, 360, 370, and 380 as read system circuits reading from the DRAM 147 or SRAM 148. Thus, it is possible to switch at a fast timing, for example, when read operation cuts in etc., and there is an advantage of improvement of the read performance.

Also, the memory I/F circuit 144 accesses the DRAM 147 based on addressing in a predetermined interleave mode in units of, for example, 16 pixels or 8 pixels, and a limit is set on the region to be accessed, so an image processing apparatus without causing any page violations can be realized.

Furthermore, according to the present embodiment, since the DRAM 147 built in a semiconductor chip has a configuration for storing display data and texture data required by at least one graphic element, the texture data can be stored in a portion other than the display region and the built-in DRAM can be effectively used. Thus, an image processing apparatus capable of high speed processing operation and reducing the power consumption can be realized.

Furthermore, a single memory system can be realized and all processing can be completed just in the built-in insides. As a result, there is a large paradigm shift in architecture.

Also, since the memory can be efficiently used, processing can be performed just in the built-in DRAM, and the large band width between the memory and the drawing system due to being inside can be sufficiently used. It is also possible to build special processing into the DRAM.

Furthermore, in the display address space, display elements of adjacent addresses are arranged to be in different DRAM blocks to each other, so it is possible to efficiently use a bit line. Thus, in a case where accesses are often made to relatively close display regions such as when drawing a graphic, the probability of simultaneously processing different modules increases and the drawing performance can be improved.

Also, by building the DRAM inside a chip, the high speed interface portion can be completed just inside the chip. Thus, it becomes unnecessary to drive a wiring capacity between chips and the power consumption becomes smaller compared with a case of not building it in.

As a result, a mechanism capable of performing everything in just a single chip by utilizing a variety of techniques has become an essential element for future portable data terminals and other familiar digital equipment.

The present invention is not limited to the above embodiments.

For example, the restriction on access patterns to the DRAM 147 is not limited to the above explanation. The present invention can also be applied for the configuration of the data rearrangement unit 400 shown in FIG. 8.

Also, the configuration of the data rearrangement unit 400 shown in FIG. 8 and the configuration of the data rearrangement circuit 420 shown in FIG. 9 are not limited to the above.

Any number of the FIFO circuits 410₁ to 410₃ shown in FIG. 8 may be provided.

The timing when the controller 440 starts the storage state of the FIFO circuit 410₃ and sends a read request may be any time except when the empty region become half.

Also, in the above three-dimensional computer graphics system 10 shown in FIG. 1, the configuration of using the SRAM 148 was shown as an example, however, the configuration need not include the DRAM 148.

Furthermore, in the three-dimensional computer graphics system 10 shown in FIG. 1, a case where geometric processing for generating polygon rendering data was performed in the main processor 11 was explained as an example, however, it may be configured to be performed in the rendering circuit 14.

As explained above, according to the storage device and the image data processing apparatus of the present invention, control of the storage device and the memory conditions by the control circuit can be made simple. Therefore, the load on the control circuit can be reduced and the waiting time of other processing by the control circuit can be shortened.

While the invention has been described with reference to specific embodiment chosen for purpose of illustration, it should be apparent that numerous modifications could be made thereto by those skilled in the art without departing from the basic concept and scope of the invention.

What is claimed is:

1. A storage device comprising:
   a data output circuit for outputting a data having a data length indicated by one read indication signal among a plurality of read indication signals giving different data length of data output, in response to one read output request;
   a memory circuit for receiving and storing the data output from said data output circuit; and
   a control circuit for outputting said output request by a number of times in response to the data length indicated by said read indication signal to said data output circuit when a predetermined amount of an empty region is generated in said memory circuit.

2. The storage device as set forth in claim 1, wherein said control circuit outputs said output request by a number of times in response to the data length indicated by said read indication signal to said data output circuit so that all of said data output from said data output circuit to said memory circuit by said output request is written in the entire region of said empty region.

3. The storage device as set forth in claim 1, wherein said memory circuit comprises a first-in first-out (FIFO) circuit.

4. The storage device as set forth in claim 1, wherein said control circuit outputs said output request for a number of times in response to the data length indicated by said read indication signal to said data output circuit when half of a memory region in said memory circuit becomes empty.

5. An image data processing apparatus, comprising:
   a first memory circuit capable of storing a plurality of image data having different data lengths of valid pixel data, output in accordance with one read request;
   a second memory circuit for receiving and storing said valid pixel data output from said first memory circuit; and
   a control circuit for outputting said read request by a number of times in accordance with the data length to said first memory circuit when a predetermined amount of an empty region is generated in said second memory circuit.

6. The image data processing apparatus as set forth in claim 5, wherein said control circuit outputs said read request for a number of times in accordance with the data length to said first memory circuit so that all of said pixel data output from said first memory circuit to said second memory circuit by said read request is written in the entire region of said empty region in said second memory circuit.

7. The image data processing apparatus as set forth in claim 5, further comprising an image processing circuit for performing image processing based on pixel data read from said second memory circuit.

8. The image data processing apparatus as set forth in claim 7, further comprising a rearrangement circuit for rearranging image data including pixel data read from said second memory circuit in pixel data units and generating image data for being input to said image processing circuit when a data length of said image data read from said first memory means and a data length of image data including said pixel data to be input to said image processing circuit are different.

9. The image data processing apparatus as set forth in claim 5, wherein said second memory circuit comprises an FIFO circuit.

10. An image data processing circuit for performing rendering processing by using polygon rendering data including three-dimensional coordinates (x, y, z), R(red), G(green) and B(blue) data, texture homogenous coordinates (s, t), and a homogeneous term q with respect to vertexes of a unit graphic, comprising:
    a first memory circuit for storing display data, and texture data required by at least one graphic element and defined a data amount of valid pixel data read by one read request;
    a second memory circuit for receiving and storing said valid pixel data read from said first memory circuit;
    an interpolation data generation circuit for interpolating polygon rendering data of vertexes of said unit graphic and generating interpolating data of pixels positioned inside said unit graphic;
    a texture processing circuit for generating "s/q" and "t/q" by dividing the texture homogeneous coordinates (s, t) included in said interpolation data by the homogeneous term q and generating display data by performing applying the texture data read from said first memory circuit on the surface of graphic elements by using a texture address in response to the "s/q" and "t/q";
    a control circuit for outputting said read request by a number of times in accordance with the data amount to said first memory circuit when a predetermined amount of an empty region is generated in said second memory circuit; and
    an interface circuit for outputting pixel data read from said second memory circuit.

11. The image data processing apparatus as set forth in claim 10, wherein said control circuit outputs said read request by a number of times in accordance with the data amount to said first memory circuit so that all of said pixel data output from said first memory circuit to said second memory circuit by said read request is written in the entire region of said empty region.

12. The image data processing apparatus as set forth in claim 10, further comprising a data rearrangement circuit for rearranging said pixel data input from said second memory circuit in accordance with a signal processing mode of said interface circuit and outputting the rearranged pixel data to said interface circuit.

13. The image data processing apparatus as set forth in claim 10, wherein said second memory circuit comprises an FIFO circuit.

14. The image data processing apparatus as set forth in claim 10, wherein said first memory circuit comprises a DRAM.

* * * * *

UNITED STATES PATENT AND TRADEMARK OFFICE
CERTIFICATE OF CORRECTION

PATENT NO.    : 6,466,219 B1
DATED         : October 15, 2002
INVENTOR(S)   : Toshiaki Shino It is certified that error appears in the above-identified patent and that said Letters Patent is hereby corrected as shown below:

Column 17,
Line 33, change "15F", to read -- 15E --.

Signed and Sealed this

Eleventh Day of February, 2003

JAMES E. ROGAN
*Director of the United States Patent and Trademark Office*